US006638635B2

(12) United States Patent
Hattori et al.

(10) Patent No.: US 6,638,635 B2
(45) Date of Patent: Oct. 28, 2003

(54) IC-MOUNTED CARD SUBSTRATE AND IC-MOUNTED PERSONAL-DATA CERTIFICATION CARD

(75) Inventors: Ryoji Hattori, Hino (JP); Nobuyuki Ishii, Hino (JP); Shigehiro Kitamura, Hino (JP)

(73) Assignee: Konica Corporation (JP)

(*) Notice: Subject to any disclaimer, the term of this patent is extended or adjusted under 35 U.S.C. 154(b) by 0 days.

(21) Appl. No.: 10/054,829

(22) Filed: Jan. 22, 2002

(65) Prior Publication Data

US 2002/0168513 A1 Nov. 14, 2002

(30) Foreign Application Priority Data

Jan. 25, 2001 (JP) ....................................... 2001-016934

(51) Int. Cl.$^7$ ................................................ B32B 27/00

(52) U.S. Cl. ....................... 428/500; 428/216; 428/339; 428/515; 428/911; 428/913; 430/14; 430/18; 430/270.1; 430/273.1; 361/737

(58) Field of Search ................................ 428/216, 911, 428/913, 339, 500, 515; 430/14, 18, 270.1, 273.1; 361/737

(56) References Cited

U.S. PATENT DOCUMENTS 4,370,403 A * 1/1983 Takaki ........................ 430/271
5,534,372 A * 7/1996 Koshizuka et al. ........... 430/10
6,207,004 B1 * 3/2001 Murasawa .................. 156/300

FOREIGN PATENT DOCUMENTS

| | | |
|---|---|---|
| JP | A-7-88974 | 4/1995 |
| JP | A-2000-211278 | 8/2000 |
| JP | A-2000-298714 | 10/2000 |

* cited by examiner

*Primary Examiner*—Deborah Jones
*Assistant Examiner*—Ling Xu
(74) *Attorney, Agent, or Firm*—Muserlian, Lucas and Mercanti

(57) ABSTRACT

An IC-mounted card substrate comprising a first sheet member having at least a first support, a second sheet member having at least a second support and an electronic part fixing layer having therein an IC-module and provided between the first sheet member and the second sheet member, wherein the second sheet member has a cushion layer comprising an actinic ray-cured resin on the second support, and a displacement value of needle penetration of the cushion layer obtained by a thermo-mechanical analysis (TMA) apparatus is not more than 30% at temperature of 100° C. and not less than 30% at a temperature of 150° C. based on the thickness of the cushion layer.

10 Claims, 14 Drawing Sheets

FIG. 1 - (1)
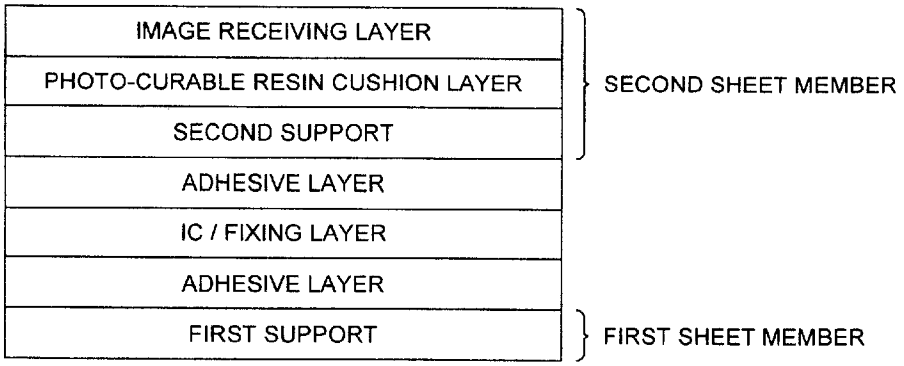
FIG. 1 - (2)
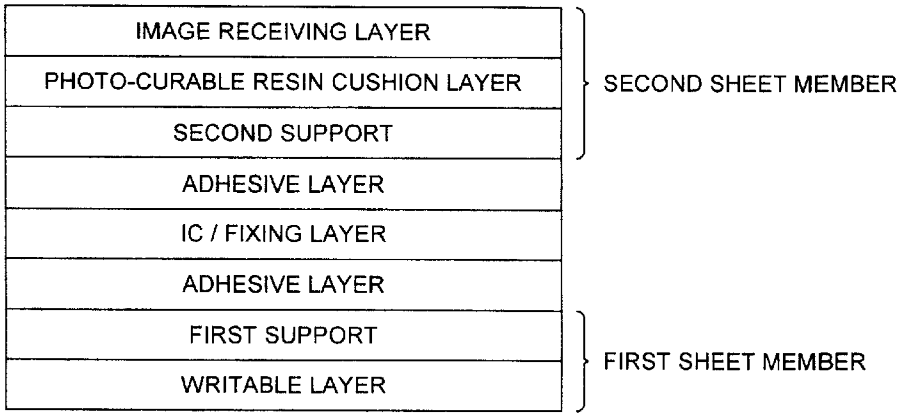
FIG. 1 - (3)
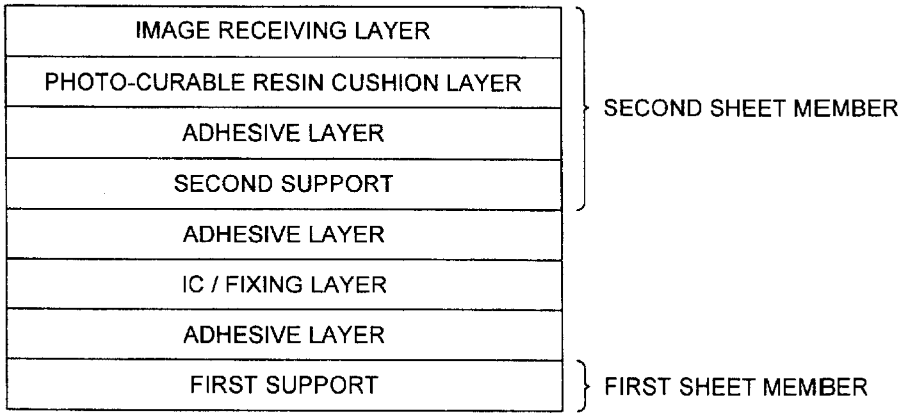

FIG. 1 - (4)
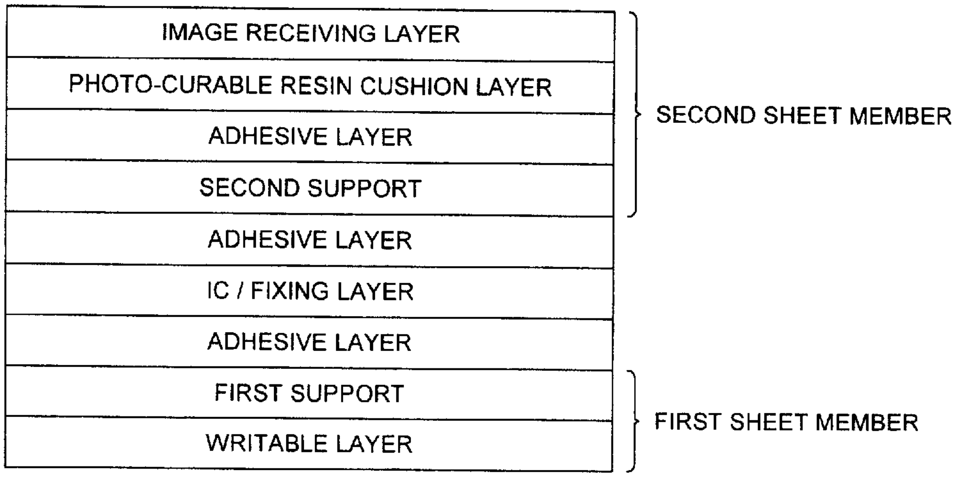
FIG. 1 - (5)
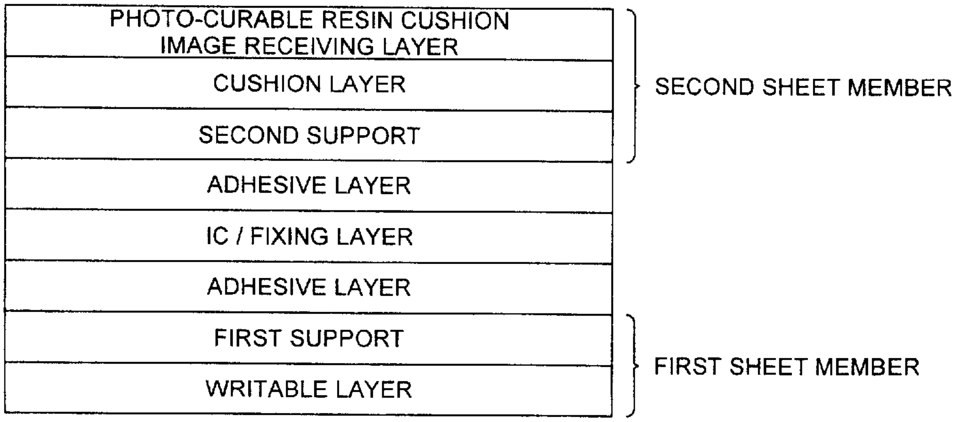
FIG. 1 - (6)
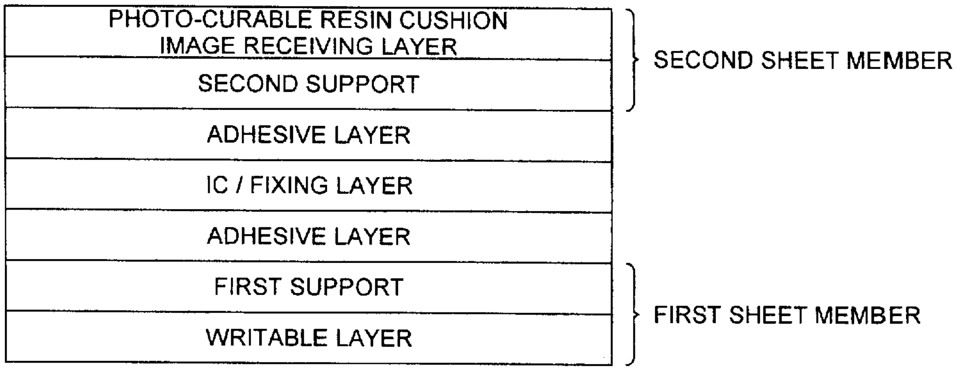

FIG. 1 - (7)
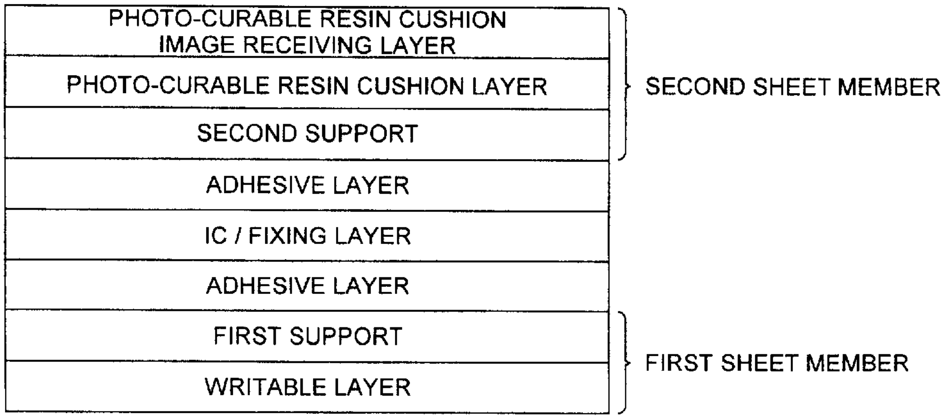
FIG. 1 - (8)
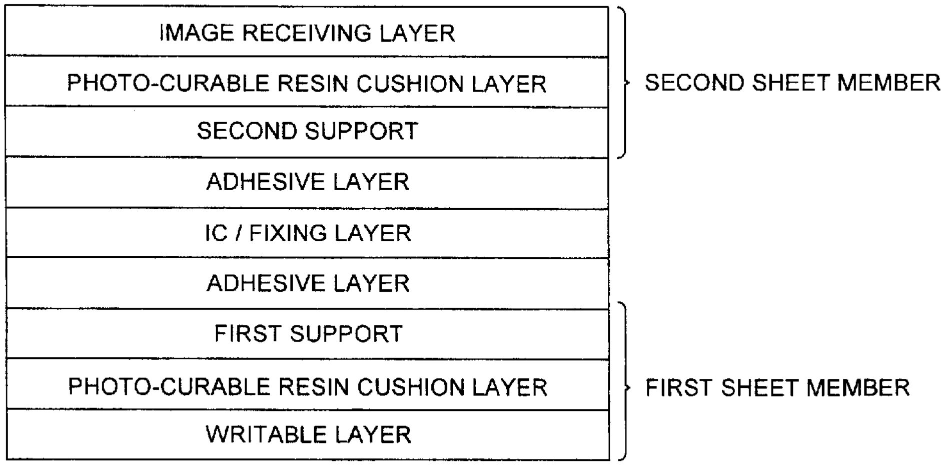
FIG. 1 - (9)
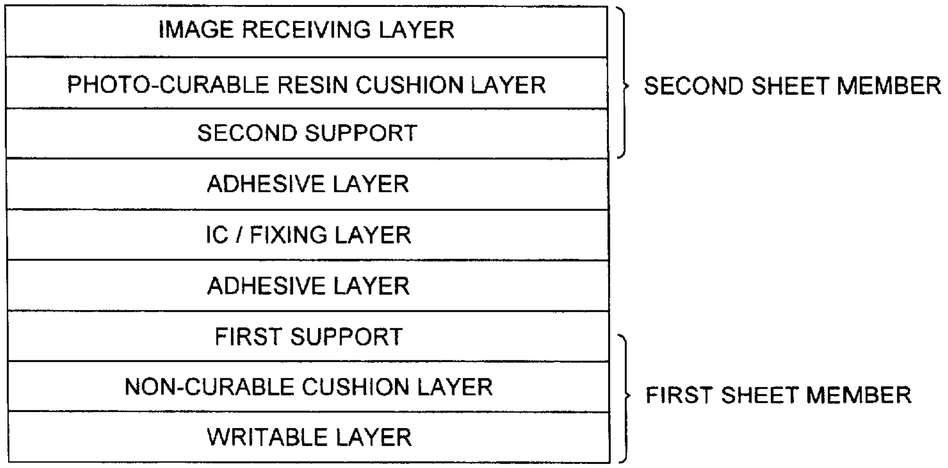

FIG. 1 - (10)
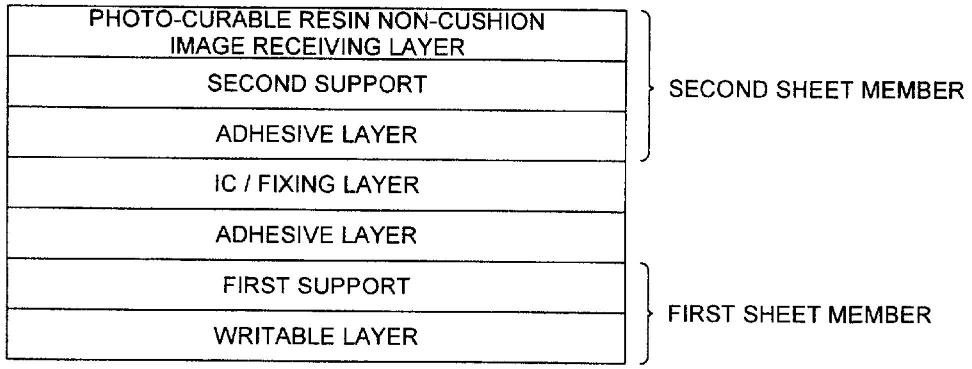
FIG. 1 - (11)
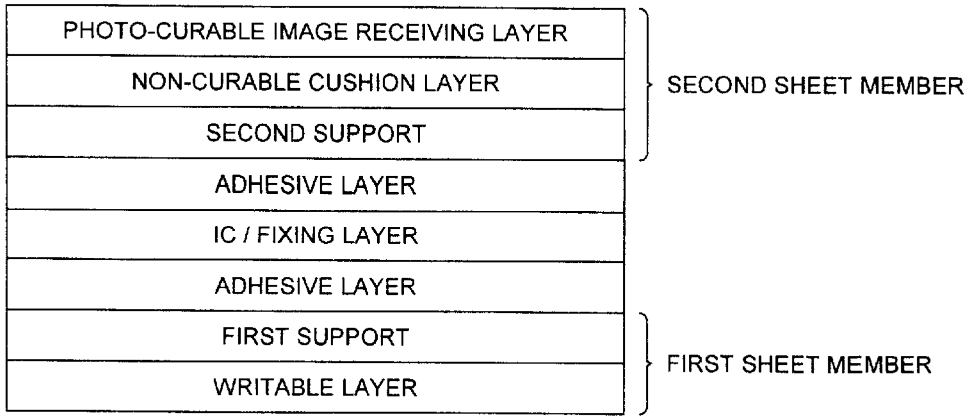
FIG. 1 - (12)
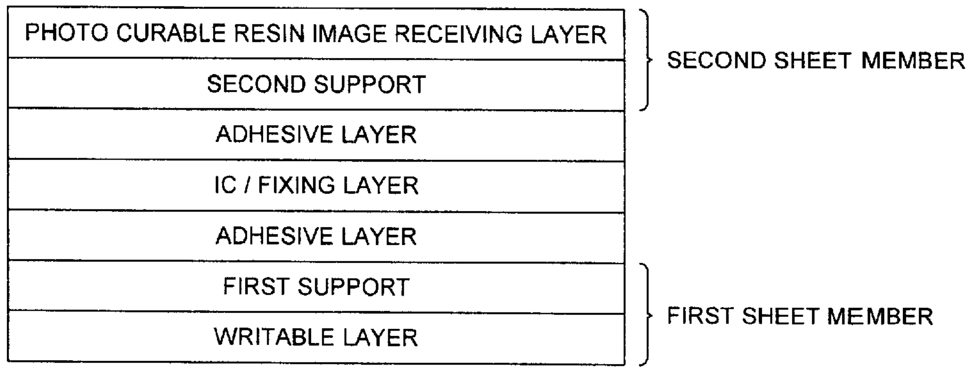

FIG. 3 - (1)
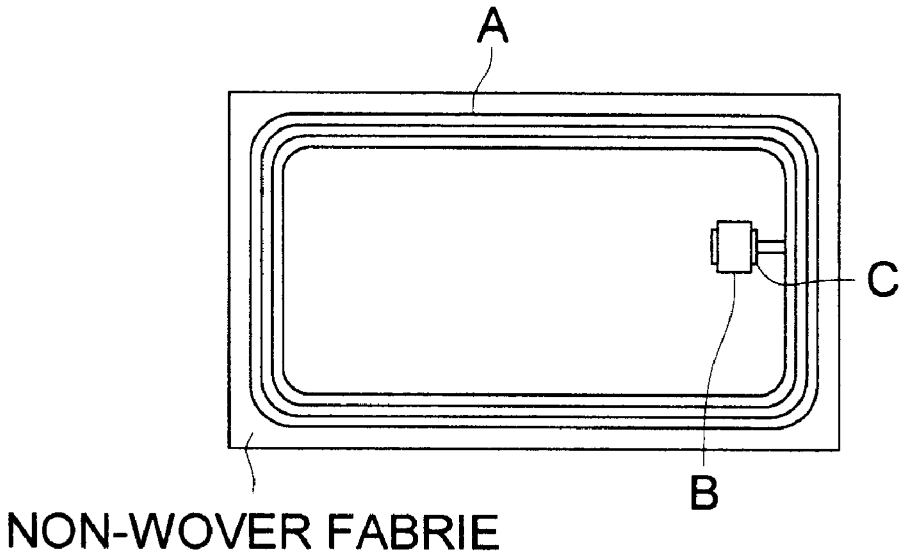
FIG. 3 - (2)
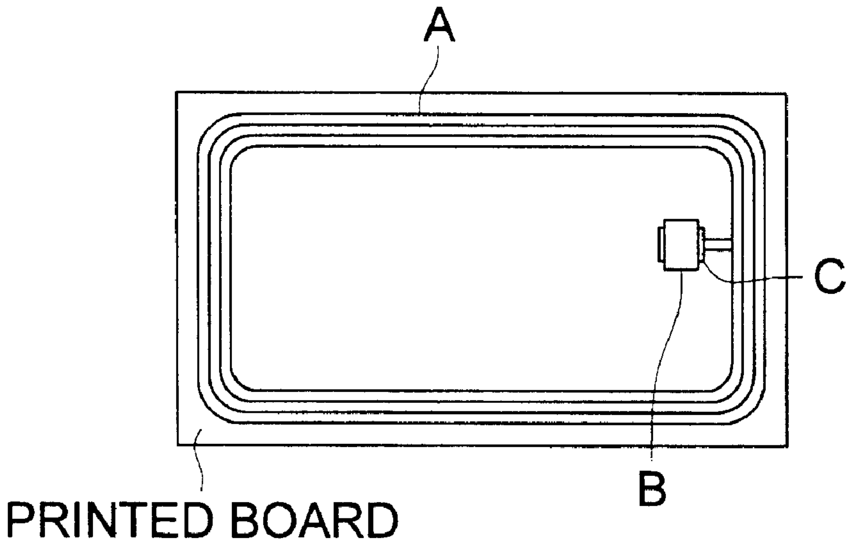

FIG. 5 - (1)
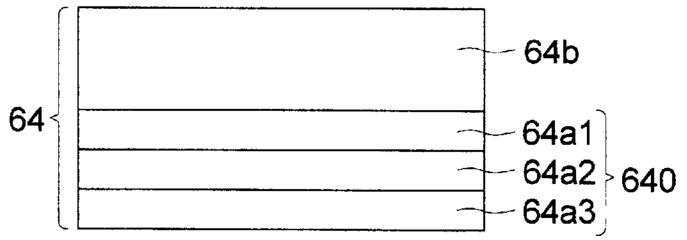
FIG. 5 - (2)
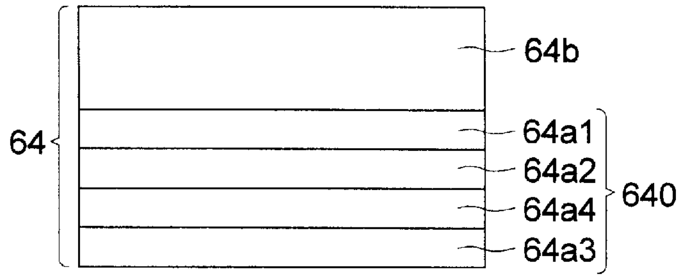
FIG. 5 - (3)
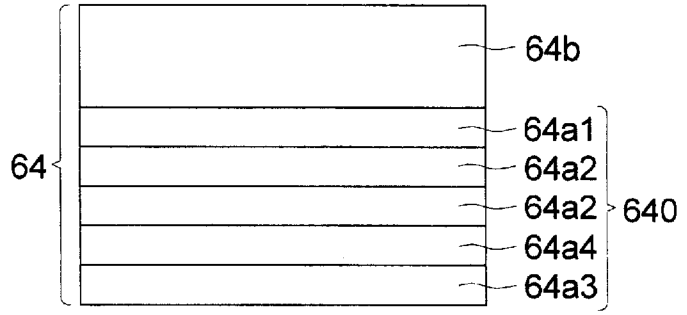
FIG. 5 - (4)
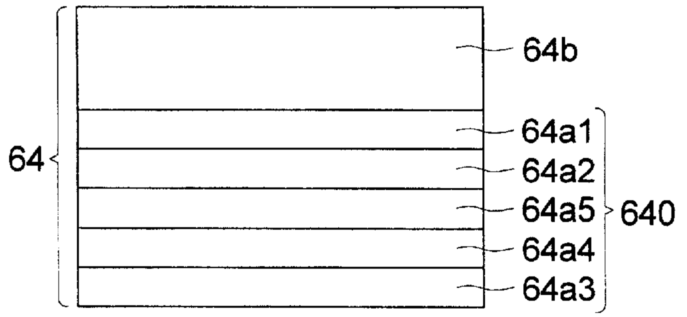

FIG. 6 - (1)
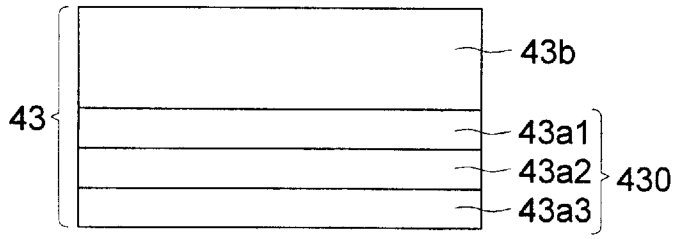
FIG. 6 - (2)
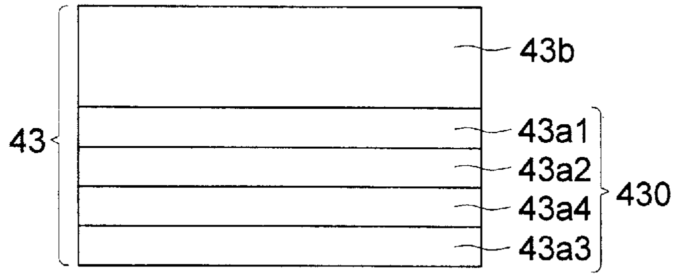
FIG. 6 - (3)
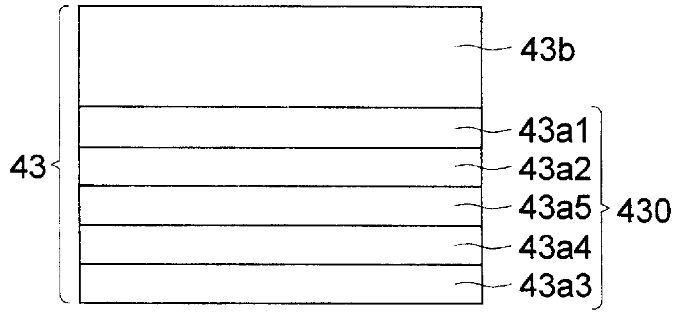
FIG. 6 - (4)
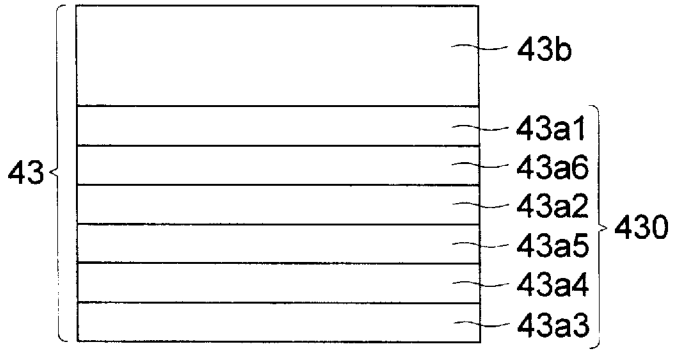

FIG. 7 - (1)
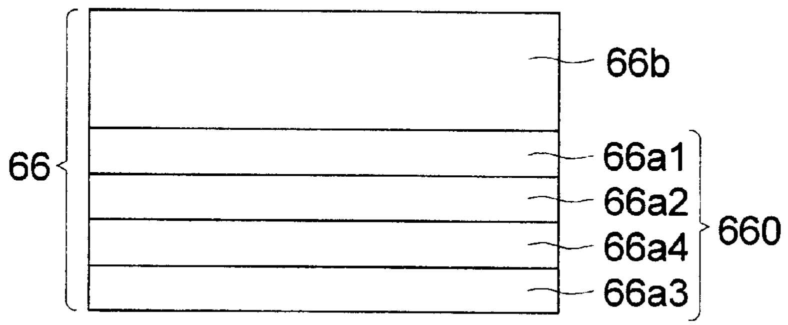
FIG. 7 - (2)
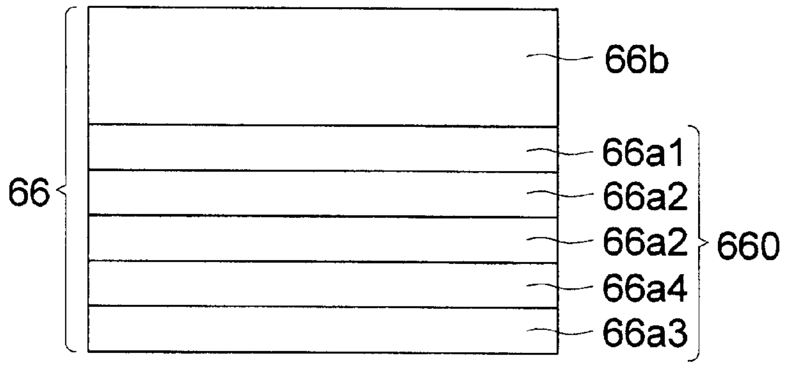
FIG. 7 - (3)
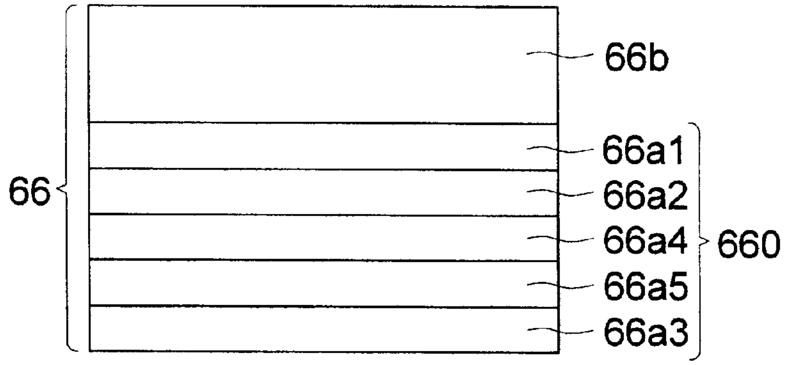

FIG. 8 - (1)
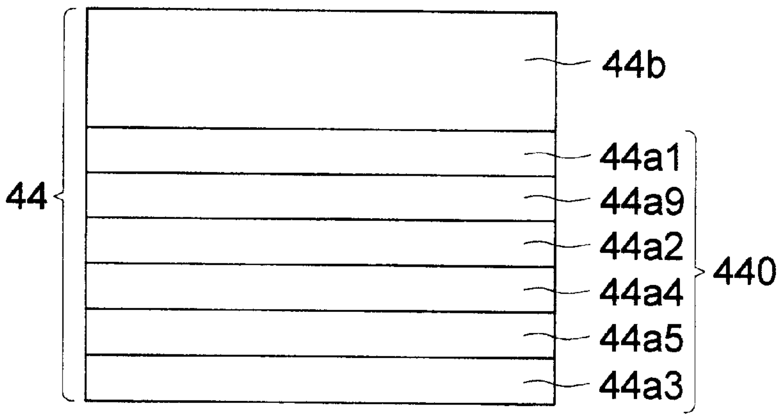
FIG. 8 - (2)
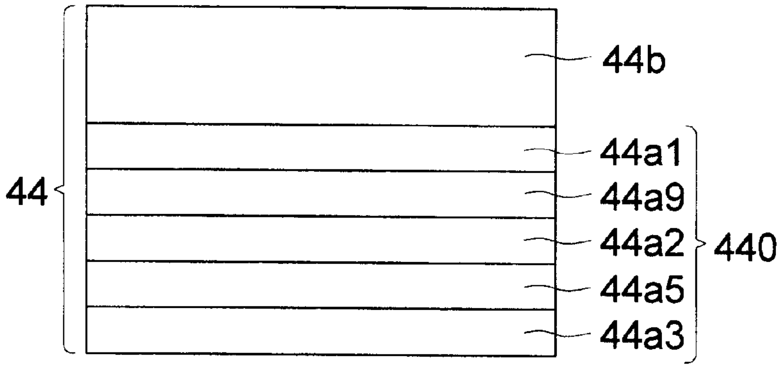
FIG. 8 - (3)
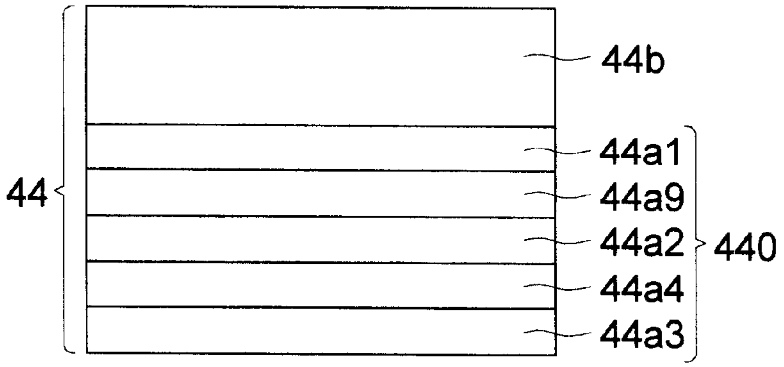

IC-MOUNTED CARD SUBSTRATE AND IC-MOUNTED PERSONAL-DATA CERTIFICATION CARD

FIELD OF THE INVENTION

The present invention relates to an IC-mounted card substrate and an IC-mounted card substrate having an image-receiving layer, which are suitably applied in a contact-type or noncontact-type card or sheet, and which electronically store personal information requiring security with respect to prevention of forgery or alteration, an IC-mounted personal-data certification card utilizing the substrate.

BACKGROUND OF THE INVENTION

As a personal-data certification card such as an identification card (ID card) and a credit card, a magnetic card which records data by means of a conventional magnetic recording method has been commonly utilized. However, a magnetic card had problems of insufficient anti-tampering with data due to the ease of rewriting of the data, of insufficient protection of data due to environmental susceptibility of the magnetic record and of insufficient memory capacity. Therefore, an IC card including an IC-tip has become popular in recent years.

However, the quality of information recorded on a conventional pre-formed IC card did not meet the requirements. For example, the surface of an IC-mounted card substrate caused unevenness or ununiformity between an IC-mounted portion and the other portion, due to the differences in factors such as hardness, thermal conductivity, thermal shrinkage after heat press, and resulted in unsuitable as a recording surface. Specifically, an IC-mounted cards had problems of causing unevenness of the surface more easily compared to a card without an IC.

JP-A 7-88974 (JP-A refers to an unexamined and published Japanese Patent Application) discloses providing an image-receiving layer and a cushion layer on an IC card substrate, however, durability of the card was not sufficient because of possible penetration of chemicals or water at the card edges due to inadequate chemical resistance of the cushion layer.

Further, a method, in which a non-cushion actinic ray-cured resin is used in an image-receiving layer of an IC-card in order to reduce thermal shrinkage occurring during printing of information recording, is disclosed in JP-A 2000-298714, however, this method had a problem in that in practical use, curling of the card resulted due to photo-curing shrinkage when the resin was photo-cured. Further, a porous film was used to provide a cushioning property, however, the cushioning property was a problem which caused insufficient printing quality due to the use of a thermal transfer recording medium. The chemical resistance of a material used for a cushion layer also resulted in insufficient durability of the card.

In order to diminish unevenness caused on the card surface, IC-card preparation methods such as, 1) utilizing an electronic part having a predetermined thickness for use in the card and 2) specifying the thickness of an adhesive, were tried in JP-A 2000-211278, however, they were not enough to diminish the unevenness of the surface.

SUMMARY OF THE INVENTION

The object of the invention is to provide an IC-mounted card substrate, which prevents deformation of a card, improves printing properties by use of means such as a thermal transfer recording medium, and exhibits improved durability of the card due to more resistance to penetration chemicals and water through the card's edges and an IC-mounted personal-data certification card utilizing the card substrate.

The object described above of the invention is achieved by the following means.

[Structure 1]

An IC-mounted card substrate comprising a first sheet member having at least a first support, a second sheet member having at least a second support and an electronic part fixing layer having therein an IC-module and provided between the first sheet member and the second sheet member, wherein the second sheet member has a cushion layer comprising an actinic ray-cured resin on the second support, and a displacement value of needle penetration of the cushion layer obtained by a thermo-mechanical analysis (TMA) apparatus is not more than 30% at temperature of 100° C. and not less than 30% at a temperature of 150° C. based on the thickness of the cushion layer.

[Structure 2]

The IC-mounted card substrate of Structure 1, wherein the second sheet member further comprises an image-receiving layer on the cushion layer.

[Structure 3]

The IC-mounted card substrate of Structure 1, wherein the cushion layer is cushioning image-receiving layer.

[Structure 4]

The IC-mounted card substrate of Structure 1, wherein adhesive layers are provided between the first sheet member and the electronic part fixing layer and between the second sheet member and the electronic part fixing layer, respectively.

[Structure 5]

The IC-mounted card substrate of Structure 1, wherein the thickness of each of the first support and the second support is within the range of 30 to 300 $\mu$m.

[Structure 6]

The IC-mounted card substrate of Structure 1, wherein the thickness of the cushion layer is within the range of 5 to 50 $\mu$m.

[Structure 7]

The IC-mounted card substrate of Structure 1, wherein the cushion layer further comprises a cushioning auxiliary agent containing at least one of a thermoplastic resin, a thermoplastic elastomers, a hot-melt adhesives and a resin having rubber elasticity.

[Structure 8]

The IC-mounted card substrate of Structure 2, wherein the second sheet member further comprises a protective layer on the image-receiving layer, and the protective layer contains at least one of a thermo-curable resin and a photo-curable resin.

[Structure 9]

The IC-mounted card substrate of Structure 3, wherein the second sheet member further comprises a protective layer on the cushioning image-receiving layer, and the protective layer contains at least one of a thermo-curable resin and photo-curable resin.

[Structure 10]

The IC-mounted card substrate of Structure 1, wherein the cushion layer is provided on the outside of the second support.

BRIEF OF THE DRAWINGS

FIG. 1-(1) shows an exemplary configuration of an IC-mounted card substrate.

FIG. 1-(2) shows an exemplary configuration of an IC-mounted card substrate.

FIG. 1-(3) shows an exemplary configuration of an IC-mounted card substrate.

FIG. 1-(4) shows an exemplary configuration of an IC-mounted card substrate.

FIG. 1-(5) shows an exemplary configuration of an IC-mounted card substrate.

FIG. 1-(6) shows an exemplary configuration of an IC-mounted card substrate.

FIG. 1-(7) shows an exemplary configuration of an IC-mounted card substrate.

FIG. 1-(8) shows an exemplary configuration of an IC-mounted card substrate.

FIG. 1-(9) shows an exemplary configuration of an IC-mounted card substrate.

FIG. 1-(10) shows an exemplary configuration of an IC-mounted card substrate.

FIG. 1-(11) shows an exemplary configuration of an IC-mounted card substrate.

FIG. 1-(12) shows an exemplary configuration of an IC-mounted card substrate.

FIG. 2 is a schematic drawing of an IC-module.

FIG. 3-(1) is a schematic drawing of an electronic part fixing layer.

FIG. 3-(2) is a schematic drawing of an electronic part fixing layer.

FIG. 4 is a brief drawing showing a preparation apparatus of an IC card substrate.

FIG. 5-(1) is a drawing showing an embodiment of a transparent protective transfer-foil 64.

FIG. 5-(2) is a drawing showing an embodiment of a transparent protective transfer-foil 64.

FIG. 5-(3) is a drawing showing an embodiment of a transparent protective transfer-foil 64.

FIG. 5-(4) is a drawing showing an embodiment of a transparent protective transfer-foil 64.

FIG. 6-(1) is a drawing showing an embodiment of an optical variable device transfer-foil 43.

FIG. 6-(2) is a drawing showing an embodiment of an optical variable device transfer-foil 43.

FIG. 6-(3) is a drawing showing an embodiment of an optical variable device transfer-foil 43.

FIG. 6-(4) is a drawing showing an embodiment of an optical variable device transfer-foil 43.

FIG. 7-(1) is a drawing showing an embodiment of a curable transfer-foil 66.

FIG. 7-(2) is a drawing showing an embodiment of a curable transfer-foil 66.

FIG. 7-(3) is a drawing showing an embodiment of a curable transfer-foil 66.

FIG. 8-(1) is a drawing showing an embodiment of a curable resin layer containing optical variable device transfer-foil 44.

FIG. 8-(2) is a drawing showing an embodiment of a curable resin layer containing optical variable device transfer-foil 44.

FIG. 8-(3) is a drawing showing an embodiment of a curable resin layer containing optical variable device transfer-foil 44.

DETAILED DESCRIPTION OF THE INVENTION

Figure 2:
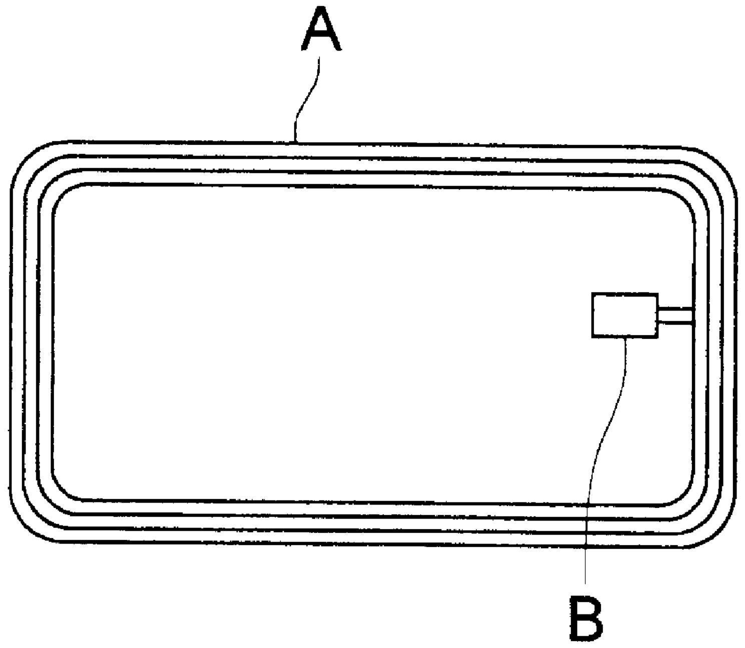

The invention will be detailed below.

In the invention, superior printability onto an image-receiving layer of a card substrate can be achieved without affecting unevenness of the surface by providing a cushion layer comprising an actinic ray-cured resin to solve the problem described above. Further, by the use of a actinic ray-cured resin cushion layer of the invention, a card can be free from damaging due to penetration of such as chemicals, and also damaging of an IC-tip caused by external stress can be prevented through stress relaxation by the cushion layer (strength against point pressure).

A cushion layer comprising an actinic ray-cured resin of the invention can be incorporated into an IC-mounted card substrate by a) being provided between an image-receiving layer and an electronic part fixing layer or by b) being combined with an image-receiving layer (an image-receiving layer is provided with cushioning property to be a cushioning image-receiving layer comprising an actinic ray-cured resin), and thereby printing property, chemical resistance, strength against point pressure and curl property of an IC-mounted card substrate have been enhanced.

In the case of an image-receiving layer being a non-cushioning actinic ray-cured resin layer, a card commonly had a tendency to suffer from curling with photo-curing shrinkage, however, the configuration of a) described above, in which a cushion layer comprising an actinic-ray cured layer is provided under an image-receiving layer, has been able to reduce curing shrinkage due to photo-cure to improve curl property thereby, and a combined-type of b) also has been able to reduce photo-curing shrinkage to minimize curl tendency.

An IC-mounted personal-data certification card prepared by providing a protective layer comprising such as a photo- or thermo-cured resin on the IC-mounted card substrate of the invention can provide a durable IC-mounted personal-data certification card with further enhanced printing property, chemical resistance and strength against point pressure.

The IC-mounted card substrate includes one with a printed format on the card substrate. The embodiment may be of any form, such as a roll, sheet or card form. The format printing is a printing of a format composed of such as ruled lines and boxes for recording information of identification and literatures, concretely, such as a company name, an address, a name, a birth date, a name of a card, a notice and a telephone number of a publisher, etc., and may include plural formats for printing these information.

An IC-mounted personal-data certification card means an IC card provided with an image element on an IC-mounted card substrate and bearing at least one selected from an identifying image such as a face image, an attribute information image and a format printing.

As the IC-mounted card substrate, is used, for example, a substrate in which first and second sheet members are laminated together with a fixing layer, and an IC-module having an IC-tip and an antenna being sealed in the fixing layer. The invention will be further detailed below.

A support used in an IC-mounted card substrate according to the invention includes the following.

<Support>

Examples of a support include single-layered sheets comprised of synthetic resin sheets of such as polyester resins such as polyethylene terephthalate, polybutylene terephthalate, and polyethylene terephthalate/iso-phthalate copolymer; polyolefin resins such as polyethylene, polypropylene and polymethyl pentene; polyfluoroethylene-type resins such as polyfluorovinyl, polyfluorovinylidene, polytetrafluoroethylene and ethylene-tetrafluoroethylene copolymer; polyamides such as 6-nylon, 6,6-nylon; vinyl polymers such as polyvinyl chloride, vinyl chloride-vinyl acetate copolymer, ethylene-vinyl acetate copolymer, ethylene-vinyl alcohol copolymer, polyvinyl alcohol, vinylon; cellulose-type resins such as cellulose triacetate and cellophane; acryl-type resins such as polymethyl methacrylate, polyethyl methacrylate, polyethyl acrylate and polybutyl acrylate; polystylene; polycarbonate; polyallylate and polyimide; or of paper such as wood free paper, thin leaf paper, grassine paper and sulfuric acid paper; and of metal foil; or multi-layered sheets in which two or more sheets thereof are accumulated. A support may be either of a single-layered or a multi-layered structure. In the invention, a fluorescent substance can be incorporated in a support. A white pigment such as titanium white, magnesium carbonate, zinc oxide, barium sulfate, silica, talc, clay and calcium carbonate is preferably added in a support substrate in advance, in order to enhance the brightness of images formed in the latter process.

Further, in the case of utilizing an image recording material (an IC-mounted card substrate bearing recorded images) for an ID card such as a driver's license card, the support is generally composed of a sheet or film comprising a white pigment described above and a vinyl chloride-type resin described bellow. Preferably, the thickness of a support of the invention is 30 to 300 $\mu$m, and more preferably 50 to 200 $\mu$m. In the case of less than 30 $\mu$m, there are often produced problems of causing thermal shrinkage at the time of laminating the first and the second sheet members.

The second sheet member is preferably provided with a cushioning layer and an image-receiving layer of the invention, or an image-receiving layer having a cushioning property (hereinafter, also referred to as a cushioning image-receiving layer) of the invention. There may be provided with at least one selected from a certifying identification image such as a face image, an attribute information image element and a format printing, and may be a white card without any printed portion, on the image-receiving layer provided on the surface of a card substrate to be used as a personal-data certification card.

The first sheet member is one which forms the back side of the IC-mounted card, and preferably to possess a writing layer having writability with a pen, and may be provided with at least one selected from an attribute information image and a format printing, in addition to or instead of on the second sheet member. Further, it is also provided with such as a cushion layer and an adhesive layer, and has no specific limitation.

The writing layer is formed, for example, by incorporating inorganic fine particles such as calcium carbonate, talc, titanium oxide and barium sulfate into a thermoplastic resin (polyolefins such as polyethylene and various copolymers) film.

In the basic constitution of a card substrate of the invention, for example, the first sheet member is laminated together with a fixing layer onto the surface opposite to the image-receiving layer side of the second sheet member, which bears a cushion layer and an image-receiving layer or a cushioning image-receiving layer of the invention described above, and an IC-module having an IC-tip and an antenna is sealed in the fixing layer.

The cushion layer of the invention will be explained below.

<Cushion Layer Comprising an Actinic Ray-Cured Resin>

The cushion layer comprising an actinic ray-cured resin used in the invention means a cushioning layer obtained by curing a composition including an actinic-ray curable compounds, which may be placed between an IC and an image-receiving layer which receives an image, or may be combined with an image-receiving layer (an image-receiving layer having a cushioning property), and means a soft resin layer which plays a role of relaxing unevenness effects due to electronic parts such as an IC-module. The cushion layer in the invention is characterized in that the displacement value of needle penetration of the cushion layer, which is obtained in a thermo-mechanical analysis (TMA) apparatus is not more than 30% at a temperature of 100° C. and not less than 30% at a temperature of 150° C., based on the thickness of the layer.

The cushion layer is specifically preferably formed, by being coated or pasted and then being transferred onto one side or both sides of another support which is substantially the same as the aforementioned sheet member. The thickness of the cushion layer is preferably 3 to 50 $\mu$m, more preferably 5 to 30 $\mu$m and still more preferably 5 to 20 $\mu$m. Coating can be performed by various methods such as reverse-roll coating, roll coating, gravure roll coating, extrusion coating and die coating.

An actinic ray-cured resin used in the invention is a resin obtained by actinic-ray curing of a composition containing a compound having addition-polymerizing or ring-opening-polymerizing capability. The addition-polymerizing compounds include a radical-polymerizing compound, and photo-polymerizing compounds described, for example, in JP-A 7-159983, JP-B 7-31399 (JP-B refers to published Japanese Patent), JP-A 8-224982, JP-A 10-863 and JP-A 9-134011. Further, photo-curable compounds of a cationic polymerizing type are commonly known and recently, those sensitized to the wavelengths longer than the visible light region are also disclosed in such as JP-A 6-43633 and 8-324137.

A radical-polymerizing compound includes commonly known photo-polymerizing compounds and thermal-polymerizing compounds. A radical-polymerizing compound has an ethylenically unsaturated bond being capable of radical polymerization, and any compound having at least one ethylenically unsaturated bond, being capable of radical polymerization, in the molecule can be used, including chemical forms of such as a monomer, oligomer and polymer. A radical polymerizing compound may be used alone, or in combination of two or more kinds at any mixing ratio to enhance aimed characteristics.

Exemplary compounds, having an ethylenically unsaturated bond being capable of radical-polymerization, include unsaturated carboxylic acid such as acrylic acid, methaacrylic acid, itaconic acid, crotonic acid, isocrotonic acid and maleic acid, and the salts thereof, as well as radical-polymerizing compounds such as various unsaturated polyesters, unsaturated polyethers, unsaturated polyamides and unsaturated polyurethanes. Concretely, they include acrylic acid derivatives such as 2-ethylhexyl acrylate, 2-hydroxyethyl acrylate, butoxyethyl acrylate, carbitol acrylate, cyclohexyl acrylate, tetrahydrofurufulyl acrylate, benzyl acrylate, bis(4-acryloxypolyethoxyphenyl)propane, neopentylglycol diacrylate, 1,6-hexanediol diacrylate, ethyleneglycol diacrylate, diethylene glycol diacrylate, triethyleneglycol diacrylate, tetraethylene glycol diacrylate, polyethyleneglycol diacrylate, polypropyleneglycol diacrylate, pentaerythlitol acrylate, pentaerythlitol tetraacrylate, dipentaerythlitol tetraacrylate, trimethylolpropane triacrylate, tetramethylolmethane tetraacrylate, oligoester acrylate, N-methylol acrylamide, diacetone acrylamide and epoxy acrylate; methaacrylic acid derivatives such as methyl methaacrylate, n-butyl methaacrylate, 2-ethylhexyl methaacrylate, raulyl methaacrylate, allyl metaacrylate, grycidyl methaacrylate, benzyl methaacrylate, dimethylaminomethyl methaacrylate, 1,6-hexanediol dimethaacrylate, ethylene glycol dimethaacrylate, triethyleneglycol dimethaacrylate, polyethylene glycol dimethaacrylate, polypropyleneglycol dimethaacrylate, trimethylolethane trimethaacrylate, trimethylolpropane trimethaacrylate, and 2,2-bis(4-methacryloxypolyethoxyphenyl)propane; as well as derivatives of allyl compounds, such as allylglycidyl ether, diallylphthalate and triallyl trimellitate; and furthermore concretely monomers, oligomers and polymers, being capable of radical-polymerizing or closs-linking, which are available on the market or well known in the art described in such as "Handbook of Cross-linking Agents" edited by Shinzo Yamashita (1981, Taisei Co.), "UV∩EB Curing Handbook (Raw Materials)" edited by Kiyoshi Kato (1985, Polymer Publishing Society), page 79 of "Application and Market of UV∩EB Curing Technology" edited by RadoTech Reseach (1989, CMC) and "Hand book of Polyester Resins" edited by Eiichi Takiyama (1988, Nikkan-Kogyo Newspaper Co.). The addition amount of the radical polymerizing compound described above in the composition including the radical-polymerizing compound is preferably 1 to 97% by weight, and more preferably 30 to 95% by weight.

It is necessary to use a radical polymerization initiator in combination in case of an actinic ray-cured resin being obtained from a composition containing a radical-polymerizing compound.

Radical polymerization initiators include triazine derivatives described in such as JP-B 59-1281, 61-9621 and JP-A 61-60104, organic peroxides described in such as JP-A 59-1504 and 61-243807, diazonium compounds described in such as JP-B 43-23684, 44-6413, 47-1604 and U.S. Pat. No. 3,567,453, organic azide compounds described in U.S. Pat. Nos. 2,848,328, 2,852,379 and 2,940,853, ortho-quinone diazides described in such as JP-B 36-22062, 37-13109, 38-18015 and 45-9610, various onium compounds described in such as JP-B 55-39162, JP-A 59-14023 and at page 1307 in "Macromolecules, Vol. No.10" (1977), azo compounds described in JP-A 59-142205, metal allene complexes described in such as JP-A 1-54440, Europian Patent 109, 851, 126,712, and at page 174 in J. Imag. Sci. vol. 30, 1986, (oxo)sulfonium organic boron complexes described in JP-A 5-213861, and 5-255347, titanocenes described in JP-A 61-151197, transition metal complexes, including transition metals such as ruthenium, described in "Coordination Chemistry Review" pp. 85 to 277, vol.85 (1988) and JP-A 2-182701, 2,4,5-triarylimidazole dimer described in JP-A 3-209477 and oraganohalogen compounds such as carbon tetrabromide and ones described in JP-A 59-107344. These initiators are preferably contained in the range of 0.01 to 10 parts by weight based on 100 parts of a compound having an ethylenically unsaturated bond being capable of radical polymerization.

Specifically preferred initiators among these are compounds, which have superior stability at ordinary temperatures and fast decomposition speed at heating and turn into colorless at decomposition, and can include such as benzoyl peroxide and 2,2'-azobisisobutylonitrile. In the invention, these thermal polymerization initiators can be used alone or in combination of two or more kinds thereof. Further, the amount of an initiator is preferably, in general, 0.1 to 30% by weight, and more preferably in the range of 0.5 to 20% by weight, of the composition of polymerization.

Actinic ray-curable compounds of a cationic polymerization type include UV-curable pre-polymers and monomers, mainly of epoxy type, which can be polymerized by cationic polymerization, and pre-polymers having two or more epoxy groups in one molecule are specifically advantageously used. As these pre-polymers, for example alicyclic polyepoxides, polyglycidyl esters of a polybacic acid, polyglycidyl ethers of a polyhydric alcohol, polyglycidyl ethers of polyoxyalkylene glycol, polyglycidyl ethers of an aromatic polyol, hydrogenated compounds thereof, urethanepolyepoxy compounds and epoxidated polybutadienes are preferably used. These pre-polymers can be used alone or as a mixture of two or more kinds thereof.

The content of a pre-polymer, which have two or more epoxy groups in one molecule, in a coating solution to form a cushion layer comprised of an actinic ray-curable resin, is preferably not less than 70% by weight. Cationic polymerizing compounds incorporated in a cationic polymerizing composition can also include the following (1) styrene derivatives, (2) vinylnaphthalene derivatives, (3) vinylethers and (4) N-vinyl compounds:

(1) Styrene derivatives e.g., styrene, p-methylstyrene, p-methoxystyrene, β-methylstyrene, p-methyl-β-methylstyrene, α-methylstyrene, p-methoxy-β-methylstyrene, etc., (2) Vinylnaphthalene derivatives e.g., 1-vinylnaphthalene, α-methy-1-vinylnaphthalene, β-methy-1-vinylnaphthalene, 4-methyl-1-vinylnaphthalene, 4-methoxy-1-vinylnaphthalene, etc., (3) Vinylethers e.g., isobutyl vinylether, ethyl vinylether, phenyl vinylether, p-methylphenyl vinylether, p-methoxyphenyl vinylether, α-methylphenyl vinylether, β-methyisobutyl vinylether, β-chloroisobutyl vinylether, etc., and (4) N-vinyl compounds e.g., N-vinylcarbazole, N-vinylpyrrolidone, N-vinylindole, N-vinylindole, N-vinylpyrrole, N-vinylphenothiazine, N-vinylacetoanilide, N-vinylethylacetoamide, N-vinylsuccinimide, N-vinylphthalimide, N-caprolactam, N-vinylimidazole, etc.

The content of cationic polymerizing compounds described above in an actinic ray-cured resin of a cationic polymerization type is preferably 1 to 97% by weight, and more preferably 30 to 95% by weight.

An initiator for actinic-ray curable compounds of a cationic polymerization type includes an aromatic onium salt. Examples of the organic onium salt include salts of Va group elements of the periodic table such as phosphonium salts (for example, triphenylphenacylphosphonium hexafluorophosphate), salts of VIa group elements such as sulfonium salts (for example, triphenylsulfonium tetrafluoroborate, triphenylsulfonium hexafluorophosphate, tris(4-thiomethoxyphenyl)sulfonium hexafluorophosphate and triphenylsulfonium hexafluoroantimonate) and salts of VIIa group elements such as iodonium salts (for example, diphenyliodonium chloride).

To use these aromatic onium salts as a cationic polymerization initiators of epoxy compounds is detailed in U.S. Pat. Nos. 4,058,401, 4,069,055 4,101,513 and 4,161,478.

The preferred cationic polymerization initiators include sulfonium salt of VIa group elements. Among them, specifically preferable is triarylsulfonium hexafluoroantimonate in respect to UV curing property and pot life of an UV-curable composition. Further, photo-polymerization initiators commonly known and described at pages 39 to 56 in "Handbook for Photopolymers" (edited by Photopolymer Consultation Meeting, published by Kogyo-Chosakai in 1989) and compounds described in JP-A 64-13142 and 2-4804, can be arbitrarily used. The content of cationic polymerization initiators described above in the composition containing a cationic polymerizing compound is preferably 1 to 30% by weight, and more preferably 0.5 to 20% by weight.

To prepare a layer comprised of an actinic ray-cured resin, additives such as a polymerization accelerator, a chain transferring agent, a polymerization inhibitor, an anti-static agent, a surfactant, another resin, etc., described bellow, may be optionally contained in the composition containing the actinic-ray curable compound.

<Polymerization Accelerator, Chain Transferring Agent>

A polymerization accelerator or a chain transfer catalyst may be added into the composition for preparing an actinic ray-cured resin used in the invention. Examples of them include amines such as N-phenylglycine, triethanol amine and N,N-diethylaniline, thiols described in U.S. Pat. No. 4,414,312 and JP-A 64-13144, disulfides described in JP-A 2-291561, thiones described in U.S. Pat. No. 3,558,322 and JP-A 64-17048, and o-acylthiohydroxamate and N-alkoxypyridinethiones described in JP-A 2-291560.

<Polymerization Inhibitor>

To prepare an actinic ray-cured resin, a polymerization inhibitor can be incorporated in the composition containing a radical-polymerizing compound to prevent polymerization during storage of the solution. Examples of a thermal-polymerization inhibitor, which can be added to the radical-polymerizing composition, include p-methoxy phenol, hydroquinone, alkyl substituted hydroquinone, catechol, t-butyl catechol and phenothiazine. These thermal-polymerization inhibitors preferably added in a range of 0.001 to 5 parts by weight based on 100 parts by weight of a compound having an ethylenically unsaturated bond being capable of radical polymerization.

<Anti-Static Agent>

Anti-static agents include, in addition to cationic surfactants, anionic surfactants, nonionic surfactants, polymeric surfactants and electric conductive fine particles, compounds described in "Chemical Products of 11290" pp. 875 to 876, by Kagaku-Kogyo Nippo Co.

<Surfactant>

As surfactants, can be added nonionic surfactants described in such as JP-A 62-251740 and 3-208514 or amphoteric surfactants described in such as JP-A 59-121044 and 4-13149.

Further, they include surfactants such as silicone oil, silicone/alkyleneoxide copolymer (for example, L-5410 available on the market from Union Carbide Co.), silicone-type surfactants such as produced by NIPPON-UNICAR CO., LTD silicon oil containing aliphatic epoxides and Si-type monoepoxide containing silicon. Si-type additives described in such as "New Silicones and Application thereof" published by Toshiba Silicone Co. in 1994, and "Chemicals Catalogue of Speciality Silicone" published by AZmax Co., Ltd in 1996 can also be used. The addition amount is preferably 0.001 to 1% by weight.

<Resin>

Polyvinyl butyral resins, plyurethane resins, polyamide resins, polyester resins, epoxy resins, novolak resins; vinyl monomers of styrene, paramethyl styrene, methacrylate ester and acrylate ester; cellulose-types, thermoplastic polyesters, natural resins and combinations with any other high polymers can be used. Further, organic high polymers well known in the art described in "New∩Practical Technology of Photo-sensitive Resins" (by CMC Co., 1987) edited by Kiyoshi Akamatsu, and "Chemical Products of 10188" pp.657 to 767 (by Nikkan-Kogyo Nippo Co., 1988) may also be used in combination.

Among these, preferable are resins containing an unsaturated group capable of being polymerized by a radical or an acid, and resins described in JP-A 9-134011 can be used. Examples, herein, include resins having an unsaturated group such as a glycidyl group, a (meth)acryloyl group and a vinyl group. The content of the high polymer in the actinic-ray curable composition is preferably in a range of 0.01 to 70% by weight, and more preferably in a range of 0.05 to 50% by weight.

In a cushion layer composition comprising an actinic ray-cured resin of the invention, there may optionally be used a sensitizing agent, a coating solvent, a defoaming agent, a plastisizer, stabilizing agents such as a light stabilizer, an UV absobent, an anti-oxidant and an corrosion inhibitor, a dye, an organic and inorganic pigment, oxygen eliminators such as a phosphin, a phosphonate and a phosphite, a reducing agent, a fluorescent brightening agent, a coloring agent, a non-flammable agent, a foaming agent, an anti-mold agent, a magnetic substance, additives providing other various characteristics, and a diluent solvent. Further, a Si-type compound and/or a wax may be added to modify the coated film surface.

<Coating Solvent>

In the invention, when forming a cushion layer by coating, a coating solvent used therein is not specifically limited; and coating solvents usable in the invention are detailed in "Handbook of Solvent" published by Kodansha. At the use of these organic solvents, there are no specific limitations.

To obtain a cushion layer comprised of an actinic ray-cured resin of the invention, highly flexible polymeric compounds having rubber elasticity are preferably selected. It is specifically preferable that the displacement value of the needle penetration of a thermo-mechanical analyzer (TMA) at a temperature of 100° C. is not more than 30% and that at a temperature of 150° C. is not less than 30%, based on the film thickness. Concretely, at the selection of the actinic ray-cured resin described above, it is preferred to select at least one of urethane-type polymeric compounds, alkylglycol-type polymeric compounds, propyleneglycol-type polymeric compounds, ethyleneglycol-type polymeric compounds and long-chain alkyl group containing polymeric compounds. In the invention, furthermore preferable is to use cushioning auxiliaries.

<Cushioning Auxiliary>

At the selection of the actinic ray-cured resin of the invention, materials having high flexibility, materials having a low modulus of elasticity or materials having rubbery elasticity can be added as cushion-providing auxiliaries.

Concretely, it is preferable to add a cushioning auxiliary agent containing at least one of a) thermoplastic resins, b) thermoplastic elastomers, c) hot-melt adhesives and d) resin having rubber elasticity. Thereby, printing property, strength against point pressure and anti-curl property are enhanced. In addition thereto, adhesion to an image-receiving layer is improved when an image-receiving layer is formed, and further, the adhesion to a surface protective layer is also enhanced when a surface protective layer is formed on the image recording materials.

In the invention, it is preferred that the cushioning auxiliary described above is mixed with or dispersed in the composition including an actinic-ray curable compound to form a cushion layer comprised of an actinic ray-cured resin.

The cushioning auxiliary is preferably added into the actinic ray-cured resin forming composition in an amount of 0.1 to 80% by weight, and more preferably at 0.1 to 60% by weight.

Thermoplastic resins of a) include polyacetoacetal butyral resin, polyurethane resin, cellulose resin, polystyrene-type resin, acryl resin and polycarbonate resin. These thermoplastic resins are preferably have a thermal softening point of not lower than 150° C. Urethane resin, and acryl resin are specifically preferred in the invention. Concretely, they are such as Nipporan Series produced by NIPPON POLYURETHANE INDUSTRY CO., LTD. and polybutylacrylate.

The thermoplastic elastomer of b) is a resin that has characteristic similar to vulcanized rubber, exhibiting elasticity at ordinary temperature, and having characteristics similar to ordinary thermoplastic resins at a high temperature. Further, the thermoplastic elastomers generally have both components of a soft segment (a soft phase) provided with elasticity and of a hard segment (a hard phase) to prevent plastic deformation, within their molecules.

Examples of thermoplastic elastomers include a styrene-type (styrene block copolymer (SBC)), an olefine-type (TP), a polystyrene-polyolefine block polymer-type, an urethane-type (TPU), a polyester-type (TPEE), a polyamide-type (TPAE), a 1,2-polybutadiene-type, a vinyl chloride-type (TPVC), a fluoride type, ionomer resins, polyethylene chlorides and a silicone type, and concretely, they are described in such as 1996 edition of "Chemical Products of 12996" (Kagaku-Kogyo Nippo Co.) and "Polyfile" pp. 77 to 112, published in August, 1998.

A thermoplastic elastomer of polystyrene-polyolefin block-polymer preferably used in the invention is a thermoplastic elastomer having a tensile elongation of not less than 100% and refers to a thermoplastic resin comprising styrene and a saturated straight-chain or branched alkyl block with carbon atoms of not more than 10 (hereinafter, also denoted as thermoprastic resin S1). Specifically preferred are a block-polymers having a polystyrene phase and a phase of hydrogenated polyolefin such as styrene-butadiene-styrene (SBS), styrene-isoprene-styrene (SIS), styrene-ethylene/butylene-styrene (SEBS), styrene-ethylene/propylene-styrene (SEPS) and styrene-ethylene/propylene (SEP).

Examples are Califlex and TR∩Kraton D and G series produced by Shell Chemicals Co., Tuftec H and M series produced by Asahikasei Corp., Septon series produced by Kuraray Co., Ltd. and Epofriend series produced by DAICEL CHEMICAL INDUSTRIES, LTD.

As hot-melt adhesives of c), ones commonly used can be utilized. The main component of the hot-melt adhesives include, for example, an ethylene-vinylacetate copolymer-type, a polyester-type, a polyamide-type, a thermoplastic elastomer-type and a polyolefin-type. Examples of polyamide-type hot-melt adhesives include Macromelt series produced by Henkel Co. In the invention, is preferred a hot-melt adhesive of thermoplastic elastomer-type, and examples are Califlex TR and Kraton series produced by Shell Chemicals Co., Tafplene produced by Asahikasei Corp., Tafdene produced by Firestone Synthetic Rubber and Latex Co., Solprene 400 series produced by Asahikasei Corp. Examples of a polyolefin-type hot-melt adhesives include Sumitic produced by Sumitomo Chemicals Co., Bistac produced by Chisso Petrochemicals Co., Ucatac produced by Mitsubishi Chemical Co., Macromelt series produced by Henkel Co., Tafmer produced by Mitsui Chemicals Co., APAO produced by Ube-Rekisen Co., Easbond produced by Eastman Chemicals Co. and A-FAX produced by Harcules Co.

Resin having rubbery elasticity of d) generally represents resins. Examples are those having a large needle penetration among the following resins: closs-linked rubber particles, natural rubber, acrylate rubber, butyl rubber, nitrile rubber, butadiene rubber, isoprene rubber, styrene-butadiene rubber, chloroprene rubber, urethane rubber, silicone rubber, acryl rubber, florine rubber, neoprene rubber, polyethylene chlorosulfonate, epichlorohydrin, EPDM (ethylene∩propyrene∩diene rubber), elastomer such as urethane elastomer, polyethylene, polypropyrene, polybutadiene, polybutene, impact-resistant ABS resin, polyurethane, ABS resin, acetate, cellulose acetate, amide resin, polytetrafluoroethylene, nitrocellulose, polyester, anti-striking acrylate resin, styrene/butadiene copolymer, styrene TPE, ethylene-vinyl acetate copolymer, acrylonitrile-butadien copolymer, vinyl chloride-vinyl acetate copolymer, polyvinyl acetate, plastisizer containing vinylchloride resin, vinylidene chloride resin, polyvinylchloride, polyvinylidene chloride and vinyl copolymer resin containing (metha)acryl monomer having long chain alkyl group. To enlarge the degree of needle penetration, plastisizers and the like also can be added into polymers described above.

<Penetration Displacement in TMA>

The cushion layer comprising an actinic ray-cured resin of the invention exhibits a displacement value of needle penetration, which is determined in a thermo-mechanical analysis (TMA) apparatus being not more than 30% at a temperature of 100° C. and not less than 30% at a temperature of 150° C., based on the thickness of the layer.

In cases where the displacement value of penetration obtained in thermo-mechanical analysis (hereinafter, also denoted as a penetration displacement) is less than 30% at a temperature of 150° C., deformation in the card occurs at a relatively high temperature, producing problems as an IC-mounted personal-data certification card. In the invention, the displacement value of penetration in the thermo-mechanical analysis (TMA) at a temperature of 150° C. is preferably not less than 50%.

In the measurement of a displacement value of needle penetration in a thermo-mechanical analysis, the layer to be measured is formed on a support, the formed layer sample is cut to the size of 4 mm×4 mm, and the displacement value (%) of needle penetration, based on the thickness of the layer is determined at 100° C. and 150° C. by the use of a thermo-mechanical analysis apparatus (ThermoFlex, produced by Rigaku-Denki Co.).

<Image-Receiving Layer>

An image-receiving layer formed on the second sheet member described above is formed of a binder and various additives.

Preferably, the image-receiving layer according to the invention not only forms contrast information containing images including an identification image such as a face image and an attribute information image, by means of a sublimation thermal transfer method but also forms letter information containing images, such as identification information and literature information, i.e., a format printing composed of a company name, an address, a name, a birth date, a name of a card, a notice, a telephone number of a publisher, discrimination information and ruled lines, by means of a sublimation thermal transfer method or a fusion thermal transfer method, so that superior dying ability of sublimation dyes, or superior adhesion of thermal-fusion inks as well as dying ability of sublimation dyes are required. To provide such specific properties, it is preferable to suitably adjust the kind of a binder and various additives, and their amounts, as described below.

Components forming the image-receiving layer will be detailed below. As binders for an image-receiving layer in the invention, binders commonly known as for an image-receiving layer of sublimation thermal transfer recording are preferably used. Examples include polyvinyl chloride resins, copolymer resins of vinyl chloride and other monomer (such as isobutyl ether and vinylpropionate), polyester resins, poly(metha)acrylate esters, polyvinyl pyrrolidone, polyvinylacetal-type resins, polyvinyl butyral-type resins, polyvinyl alcohol, polycarbonate, cellulose triacetate, polystyrene, copolymers of styrene and other monomer (such as acrylate ester, acrylonitrile and ehtylene chloride), vinyltolueneacrylate resins, polyurethane resins, polyamide resins, urea resins, epoxy resins, phenoxy resins, polycaprolactone resins, polyacrylonitrile resins and modified compounds thereof, and preferable are polyvinyl chloride resins, copolymers of vinyl chloride and other monomer, polyester resins, polyvinylacetal-type resins, polyvinylbutyral-type resins, copolymers of styrene and other monomer and epoxy resins.

However, provided that there are practical requirements for images formed according to the invention (for example, an ID card issued is required to have a predetermined thermal resistance), the kind or combination of binders has to be taken into account to satisfy the required items. With regard to thermal resistance of the images, for example, if a thermal resistance of 60° C. or higher is required, binders having a Tg of not lower than 60° C. are preferably used, taking bleeding of sublimation dyes into consideration Further, in the formation of the image-receiving layer, it is often preferred that a metal-ion containing compounds are incorporated, specifically in cases where a thermal-transferable compound is capable of reacting with the metal-ion containing compound to form a chelate complex.

Metal ions forming the metal-ion containing compounds, as described above include, for example, divalent or polyvalent metals belonging to I to VIII groups of the periodic table, and of these are preferred Al, Co, Cr, Cu, Fe, Mg, Mn, Mo, Ni, Sn, Ti, Zn, etc., and specifically preferable are Ni, Cu, Co, Cr, Zn, etc. Preferable compounds containing these metal ions are inorganic or organic salts of the metals and complexes of the metals. Examples thereof include complexes of $Ni^{2+}$, $Cu^{2+}$, $Co^{2+}$, $Cr^{2+}$ and $Zn^{2+}$, represented by the following general formula:

$$[M(Q_1)_k(Q_2)_m(Q_3)_n]^{p+}p(L^-)$$

where M represents a metal ion; $Q_1$, $Q_2$ and $Q_3$ each represent a ligand which can form a coordination bonding with metal ions represented by M, and examples thereof can be selected from those described, for example, in "Chelate Chemistry (5)" (published by Nankodo). Spesifically preferred examples include ligands having at least one amino group which can form a coordination bonding with a metal, and more concretely, include ethylenediamine and its derivatives, glycineamide and its derivatives and picolineamide and its derivatives. L represents counter anions which can form complexes, including inorganic compound anions such as Cl, $SO_4$ and $ClO_4$, and organic compound anions such as benzenesulfonic acid derivatives, alkylsulfonic acid derivatives, and specifically preferable are tetraphenylboron anion and its derivatives, and alkylbenzenesulfonic acid anion and its derivatives. "k" represents an integer of 1, 2 or 3, m represents 1, 2 or 0, n represents 1 or 0, and they are determined depending on whether the complex represented by the general formula described above is tetradentate or hexadentate, or depending on the number of ligands of $Q_1$, $Q_2$ and $Q_3$. "p" represents 1, 2 or 3.

Examples of this kind of metal-ion containing compounds include those exemplarily described in U.S. Pat. No. 4,987,049. The metal ion containing compounds described above is added preferably in an amount of 0.5 to 20 g/m$^2$, and more preferably 1 to 15 g/m$^2$, based on the image-receiving layer.

A mold-releasing agent is preferably added into the image-receiving layer. Effective mold releasing agents are preferably compatible with the binder being used, exemplarily include modified silicone oils and modified silicone polymers such as amino-modified silicone oils, epoxy-modified silicone oils, polyester-amino-modified silicone oils, acryl-modified silicone resins and urethane-modified silicone resins. Polyester-modified silicone oils among them are specifically superior in respect to preventing melt adhesion with ink sheet but not disturbing easiness of secondary processing of an image-receiving layer. The easiness of secondary processing of an image-receiving layer refers to such as writability with a magic ink and laminatability which is required in case the images and letters have to be protected. Furher, fine particles such as silica are also effective as a mold releasing agent. In case of the easiness of secondary processing is not a problem, curable silicone compounds may be utilized effectively as a prevention means of melt adhesion. UV-curable silicone, reaction-curable silicone, etc. are available on the market, and remarkable mold releasing effect can be expected.

The image-receiving layer of the invention can be manufactured by a coating method in which the image-receiving layer coating solution, in which composing components are dissolved or dispersed in a solvent, is prepared, being coated on the surface of a support described above (second support) sandwiching a cushion layer, and dried.

The thickness of an image-receiving layer formed on the surface of a support (second support) is generally 1 to 50 μm, and preferably 2 to 10 μm. In the invention, a barrier layer other than a cushion layer of the invention, in addition to a cushion layer of the invention, may be provided between the support and the image-receiving layer, and an adhesive layer may be provided between the cushion layer of the invention and the second support.

<Cushioning Image-Receiving Layer Comprised of Actinic Ray-Cured Resin>

A cushioning image-receiving layer comprising an actinic ray-cured resin represents the image-receiving layer in which the binder materials are replaced by the cushioning composition comprised of an actinic ray-cured resin, as described earlier, which is the image-receiving layer integrally with a cushion layer and capable of acting as a cushion layer used in the invention.

The content of an actinic ray-cured resin in the cushioning image-receiving layer is preferably 5 to 90% by weight, more preferably 10 to 90% by weight, and furthermore preferably 10 to 80% by weight, based total solids. The thickness of a cushion image-receiving layer comprised of an actinic ray-cured resin used in the invention is 1 to 50 μm, and preferably 1 to 10 μm.

In the invention, a barrier layer can be provided between the support (of the second sheet member) and the cushioning image-receiving layer, and an adhesive layer can be provided between the cushioning layer and the support.

<Adhesive Layer>

Adhesive layer can be provided to enhance adhesion of the actinic ray-cured resin layer with a support and comprising a resin layer of such as a coupling agent, a latex and a hydrophilic resin. The support may be optionally subjected to adhesion-enhancing treatment such as a corona discharge and plasma treatment.

<Barrier Layer>

In a barrier layer, can be used, for example, vinylchloride-type resins, polyester-type resins, acryl-type resins, polyvinylacetal-type resins, polyvinylbutyral-type resins, polyvinylalcohol, polycarbonate, cellulose-type resins, styrene-type resins, urethane-type resins, amide-type resins, urea-type resins, epoxy-type resins, phenoxy-type resins, polycaprolactone resins, polyacrylonitrile resins, SEBS resins, SEPS resins and modified substances thereof.

The preferable resins among those described above are vinylchloride-type resins, polyester-type resins, acryl-type resins, polyvinylbutyral-type resins, styrene-type resins, epoxy resins, urethane-type resins, urethaneacrylate-type resins, SEBS resins and SEPS resins. These resins can be used alone or in combination of two or more kinds.

Examples of the concrete compounds are preferably a thermoplastic resin comprising a block copolymer of polystyrene and polyolefin, and polyvinylbutyral.

<Electronic Part>

The electronic part used in the invention (also referred to as an IC-module) comprises an IC-tip, in which at least an information about an user of the IC-mounted personal-data certification card is electrically memorized, and an information recording member having a coil-formed antenna connected to the IC-tip. The IC-tip may be comprised of only a memory, or may additionally include a microcomputer. The electronic part used in the invention may optionally include a condenser. Any electronic part, provided that it is necessary for an information recording material, can be used without specific limitation.

The IC-module includes an antenna coil, and in the case of including an antenna pattern, any method such as an electric-conductive paste printing process, a copper-foil etching process and a wire welding process can be utilized. As a print board, a thermoplastic film such as polyester is used, and polyimide is advantageously used in the case of relatively high thermal-resistance being required. The bonding of an antenna pattern with an IC-tip is performed by any method commonly known such as a method utilizing electroconductive adhesives such as silver paste, copper paste, carbon paste, etc, (for example, EN-4000 series produced by Hitachi-Chemical Ind. Co., Ltd. and XAP series produced by Toshiba Chemicals Co.); a method utilizing anisotropic conductive film (Anisolm produced by Hitachi Chemical Ind. Co., Ltd.); and a method utilizing solder bonding.

To avoid poor stability caused by filling an adhesive layer resin after the parts including an IC-tip are mounted onto the predetermined position in advance, such as disconnection at bonding portions due to shear stress caused by the resin flow, and damaging smoothness of the surface due to flow or cooling of the resin, the parts being enclosed in the resin layer prepared on a support in advance, so that it is preferred to use the parts in the form of a porous resin film, a porous foaming resin film, a flexible resin sheet, or a porous resin sheet or non-woven fabric sheet. For example, the method described in Japanese Patent Application No. 11-105476 can be utilized.

Further, it is also preferred to provide a reinforced plate in the neighborhood of an IC-tip because an IC-tip is weak in strength against point pressure. The total electronic part thickness is preferably 10 to 500 $\mu$m, more preferably 10 to 450 $\mu$m, and furthermore preferably 10 to 350 $\mu$m.

<Method for Equipping an Electronic Part Between the First Sheet Member and Second Sheet Member>

As a manufacturing method of equipping the foregoing electronic part between first and second sheet members, any of a thermal paste-up method, an adhesives paste-up method and an extrusion-molding method, which are commonly known, can be utilized. Further, formation of an identification image such as a face image, format printing or information recording may be performed before or after the first sheet member and the second sheet member are laminated together, and they can be formed by any method such as offset printing, gravure printing, silk printing, screen printing, intaglio printing, letterpress printing, an ink-jet method, a sublimation transfer method, an electrophotographic method and a thermal fusion method.

As a manufacturing method of an IC-mounted card substrate of the invention, can be used, for example, a paste-up method or a coating method, described in such as JP-A 2000-036026, 2000-219855, 2000-211278, 2000-219855, 10-316959 and 11-5964, and it is not specifically limited.

At the time of lamination, to enhance smoothness of the substrate surface and adhesion of the electronic parts predetermined between the first sheet member and the second sheet member, they are preferably subjected to heating and pressing, and preferably manufactured by such as an up-and-downward press method and a lamination method. Further, planer-press type is preferred so as to provide nearly line contact and avoid using rolls which may provide unreasonable bending force by even a slight shift, taking cracking of IC-parts into consideration. The heating is preferably performed at 10 to 180° C., and more preferably 30 to 150° C. The press is preferably performed at $9.81\times10$ to $2.94\times10^4$ kPa, and more preferably at $9.81\times10$ to $1.96\times10^4$ kPa. When the pressure is higher than this, IC-tip may be collapsed. The time for heating and pressing is preferably 0.001 to 90 sec., and more preferably 0.001 to 60 sec. When the time is longer than this, the production efficiency is lowered.

Further, when using a moisture-curable adhesive whose reaction speed is decreased by the effect of such as moisture, that means adhesion force or durability of the card being deteriorated, it is more effective to perform the lamination process in vacuo or in a nitrogen atmosphere. In the lamination process, because the first sheet member for a substrate, the electronic parts holding material and the second sheet member for the front surface are laminated with each other together under predetermined pressing and heating conditions, by utilizing the electronic parts holding material itself as an adhesive, the substrate material, the electronic parts holding material and the surface substrate can be laminated in good reproducibility.

The thus laminated sheet prepared as a continuous sheet by adhesive-laminating method or resin extrusion method described above, may be recorded with identification images and bibliographic items after allowed to stand for a predetermined time, and, thereafter, is shaped into a predetermined card size. As methods for shaping into a predetermined card size, are mainly selected a punching-out method and cutting-out method, and thus, the IC-mounted card substrate can be prepared.

<Adhesive Layer Resin>

As laminating material (an adhesive layer resin) used in the invention, are preferably used such as hot-melt adhesives and thermoplastic resins. For example, hot-melt adhesives commonly used can be utilized. The main component of hot melt adhesives is, for example, an ethylene-vinylacetate copolymer (EVA) type, a polyester type, a polyamide type, a thermoplastic elastomer type and a polyolefin type. As reaction-type hot-melt adhesives, moisture curable type materials are disclosed in JP-A 2000-036026, 2000-211278 and 2000-219855, and photo-curable adhesives are disclosed in such as JP-A 10-316959 and 11-5964. Any of these adhesives can be used, and the materials utilized in the invention are not specifically limited.

The embodiments of the IC-mounted card substrate, the manufacturing apparatus and the manufacturing method thereof will be explained below, referring to the drawings.

<Preparation Method of IC-Mounted Card Substrate>

FIGS. 1-(1) to 1-(12) are drawings which show exemplarily configurations of an IC-mounted substrate; FIGS. 1-(1) to 1-(9) show the embodiments of the invention; and FIGS. 1-(10) to 1-(12) show the exemplary configurations of conventional IC mounted card substrates. Herein, a layer including electronic parts such as an IC-tip is referred to as an IC/fixing layer.

FIG. 2 is a schematic drawing of an IC-module, in which an antenna coil comprising 4-times wounded copper wire (A) is connected to an IC-tip (B). FIGS. 3-(1) and 3-(2) is a schematic drawing of an IC/fixing layer utilized in the invention, wherein FIG. 3-(1) is a schematic drawing, in which non-woven fabric being formed a printed pattern thereon is connected with an IC-tip by means of such as bonding, and IC-tip reinforcing plates (C) are sandwiching the IC-tip (B) so as to cover not less than 50% of over and under the IC-tip. This procedure can provide a superior accuracy with placement of an IC-tip. IC card sheet "FT series" produced by Hitachi Maxcell Co., Ltd., for example, can be utilized. FIG. 3-(2) is a schematic drawing of a printed wiring board type, in which the printed wiring board having a printed pattern formed thereon is connected with an IC-tip by means of such as bonding, and IC-tip reinforcing plates (C) are sandwiching the IC-tip (B) so as to vertically cover at least 50% of the IC-tip. By using a non-woven fabric sheet such as a), that is a porous resin sheet, superior impregnation of adhesives at thermal paste-up is achieved, which is advantageous in respect to mutual adhesion between the materials.

Figure 4:
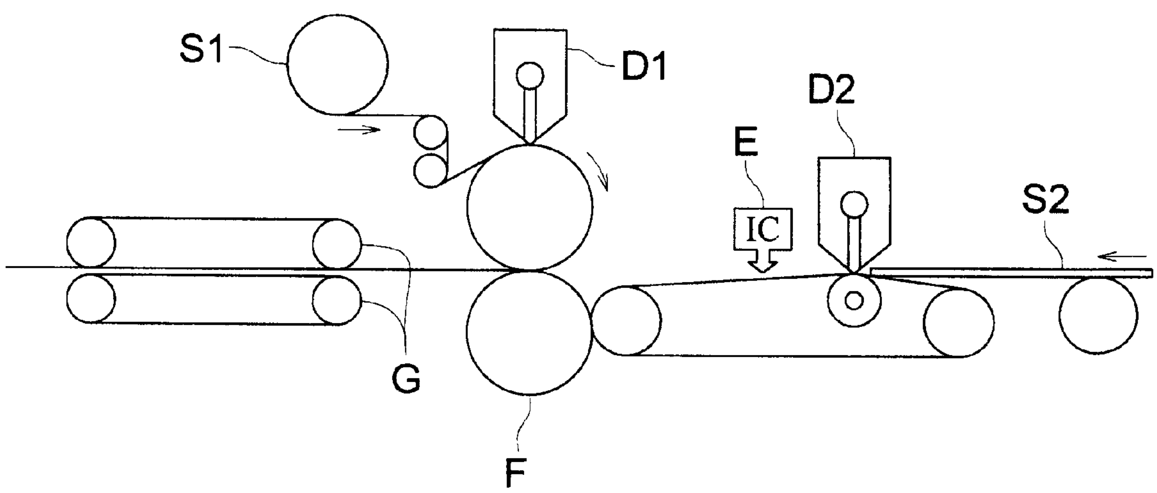

Next, a preparation apparatus of an IC-mounted card substrate and an IC card substrate provided with an image-receiving layer, will be explained as an embodiment in the invention. FIG. 4 is a schematic drawing of a preparation apparatus of an IC-mounted card substrate and an IC card substrate provided with an image-receiving layer. In the apparatus of the invention to prepare an IC-mounted card substrate and an IC card substrate attached with an image-receiving layer, for example, the first sheet member in long rolled sheet having a thickness of 75 $\mu$m and the second sheet member in long rolled sheet form having a thickness of 100 $\mu$m are loaded, respectively, on the first sheet member supply station (S1) and the second sheet member supply station (S2), an adhesive is supplied to the second sheet member from the hot-melt adhesive supply station (D2), and an IC/fixing layer material having a thickness of 300 $\mu$m, described above in FIG. 3, is supplied from an IC/fixing material supply station (E). The first sheet member being supplied with an adhesive from the hot-melt adhesive supply station (D1) and the second sheet member supplied with a hot-melt adhesive and an IC/fixing material are laminated by allowing them to pass through the heating or pressing rolls (F) (for example, at a pressure of $2.94\times10^2$ kPa) so as to sandwich the IC/fixing material and the adhesive by two sheet materials, and further by pressing to be made smooth through the caterpillar press section (G), to prepare rolled raw materials for an IC-mounted card and an IC card substrate attached with an image-receiving layer. Preferably, after sufficient curing of an adhesive and adhesion with the substrate, finish cutting is preferably performed. The prepared raw material roll can be cut into such as a size of 55×85 mm by use of a rotary cutter, to be converted to an IC-mounted card substrate.

In the invention, the surface of personal-data certification card can be protected by forming a protective layer using a thermo-curable resin composition or a photo-curable resin composition on the IC-mounted card substrate. Further, an optical variable device layer and the like can also be provided.

In the invention, examples of compositions to form a thermo- or photo-curable resin on the IC-mounted card substrate are preferably those such as epoxy-type, polyester-type and acryl-type resins blended with a hardener, a curing catalyst, a leveling agent and other additives.

<Thermo-Curable Resin Composition>

Thermo-curable resin compositions include a polyester resin composition. As the composition of polyesters are preferred those comprising aromatic dicarboxylic acids such as terephthalic acid and isophtalic acid as a main dicarbonic acid and aliphatic diols such as ethylene glycol and neopentyl glycol as a main diol component, and are more preferred are those containing thereto a small amount of, for example, aliphatic dicarboxilic acids such as adipic acid and azelaic acid, carboxylic acids of not less than tribasic such as trimellitic acid and pyromellitic acid, and alcohol of not less than trihydric such as trimethylol ethane, trimethylol propane and pentaerythritol, because melt fluidity and cross-linking reactivity are improved.

Further, the mean polymerization degree of a polyester resin is preferably in the range of 5 to 50, and those having a degree of lower than this are insufficient in the film strength while those having a degree higher than this are hard to pulverize.

Hardeners to be used for these resins, specifically for polyesters having a —OH type end group, include isocyanate componds and melamine resins, for example, $\epsilon$-caprolactam block-isocyanate and methylmelamine. For those having —COOH type end group, they include epoxy resins and triglycidyl isocyanurate.

<Photo-Curable Composition>

As preferable photo-curable compound containing compositions to form a protective layer, compounds containing radical polymerizing, addition polymerizing or ring-opening polymerizing compounds which are described in an actinic ray-cured resins being utilized as the aforementioned cushion layer are cited.

For radical polymerizing compounds an initiator of radical polymerization, and for cationic polymerizing actinic-ray curable compounds and an initiator of cationic polymerizing actinic-ray curable compounds are used in combination (similarly to that described above).

Compounds having an ethylenically unsaturated bond capable of radical polymerization, and an initiator to be used in combination therewith include all the compounds exemplified in the aforementioned cushion layer. Among these preferable compounds are similar, and the content of a radical polymerizing compound in a radical polymerizing composition is preferably 1 to 97% by weight, and more preferably 30 to 95% by weight. A radical polymerization initiator is preferably contained in a range of 0.01 to 10 parts by weight based on 100 parts by weight of a compound having an ethylenically unsaturated bond capable of radical polymerization.

Further as cationic polymerizing compounds and cationic polymerization initiators used in combination therewith also suitably can be used the compounds exemplified in aforementioned cushion layer, and specifically preferred in the invention is to use vinyl ether-type compounds as a cationic polymerizing compound. The content of a cationic polymerizing compound in a cationic polymerizing composition is preferably 1 to 97% by weight, and more preferably 30 to 95% by weight. Further, the content of a cationic polymerization initiator is 0.1 to 30% by weight, and more preferably 0.5 to 20% by weight.

Further, hybrid type photo-curable resins can be utilized as a protective layer.

<Hybrid Type Photo-Curable Resin Layer>

When a hybrid type (a combination use of a radical polymerizing type and a cationic polymerizing type) is used, compositions are disclosed in such as JP-A 4-181944. Concretely, the composition contains any one of aforementioned cationic-type initiators, cationic polymerizing compounds, radical-type initiators and radical polymerizing compounds, and there is no specific limitation.

In the invention, an acid cross-linking type photo-curable resin can also be used as a resin to form a protective layer.

<Acid Cross-Linking Type Photo-Curable Resin>

A cross-linking agent used in an acid cross-linking photo-curable composition is a compound that causes cross-linking reaction by an acid from a compound (for example, haloalkyl group-substituted s-triazines) generating an acid with radiation of light or actinic-ray. Preferable cross-linking agents are compounds having, in the molecule, two or more hydroxymethyl groups, alkoxymethyl groups, epoxy groups or vinylether groups. Preferable are compounds in which these functional groups are directly bonded to the aromatic ring. Examples include methylol meramine, resol resins, epoxidated novolac resins and urea resins. Compounds described in "Handbook for Cross-linking Agents" (Shinzo Yamashita and Tousuke Kaneko, Taisei-sha Co., Ltd.) are also preferred. Specifically, phenol derivatives having two or more hydroxymethyl groups or alkoxymethyl groups are preferred because of superior strength of a cross-linked film. Examples of these phenol derivatives include resol resins.

However, these cross-linking agents are unstable against heat resulting in being poor in pot life. On the other hand, phenol derivatives, having two or more hydroxymethyl groups or alkoxymethyl groups in the molecule, and a molecular weight of not more than 1200, are superior in pot life and most suitably used. The alkoxymethyl groups are preferably those having not more than 6 carbon atoms. Preferable examples are a methoxymethyl group, an ethoxymethyl group, a n-propoxymethyl group, an isopropoxydimethyl group, a n-butoxymethyl group, an isobutoxymethyl group, a sec-butoxymethyl group and a t-butoxymethyl group. Further, alkoxy substituted alkoxymethyl groups such as a 2-methoxy-1-propoxymethyl group are also preferred. Exemplarily, they include compounds described in such as JP-A 6-282067, 7-64285 and European Patent No. 632,003A1.

Other suitable cross-linking agents include aldehydes and ketones, and preferably compounds having, in the molecule, two or more aldehydes or ketones.

In the case of using acid cross-linking type photo-curable resins, the cross-linking agent is used in an amount of 5 to 70% by weight, and preferably at 10 to 65% by weight, based on total solid material. Addition of a cross-linking agent of less than 5% by weight results in insufficient film strength, even after cross-linking; and at over 70% by weight it is not preferable in respect to pot life. These cross-linking agents may be used alone or in combination of two or more kinds.

Photo-curable resin compositions forming the aforementioned protective layer can contain various kind of additives other than these.

<Other Additives>

Photo-curable resin compositions used in the invention can be enhanced the reactivity to the light in the region of from ultraviolet to near-infrared and made to be extremely high sensitive polymerizing compositions, by combining with various sensitizers. Examples of the sensitizers include unsaturated ketones represented by such as calcon derivatives and dibenzalacetone, 1,2-diketone derivatives represented by benzyl and camphorquinone, benzoine derivatibes, fluorene derivatives, naphthoquinone derivatives, anthraquinone derivatives, xanthene derivatives, thioxanthene derivatives, xanthantone derivatives, thioxanthantone derivatives, coumalin derivatives, ketocoumalin derivatives, cyanine derivatives, styryl derivatives, merocyanine derivatives, polymethine dyes such as oxonol derivatives, acridine derivatives, azine derivatives, thiazine derivatives, oxazine derivatives, indoline derivatives, azurene derivatives, azurenium derivatives, squalium derivatives, porphyrine derivatives, tetraphenyl porphyrine derivatives, triarylmethane derivatives, tetrabenzoporphyrine derivatives, tetrapyrazinoporphyrazine derivatives, phthalocyanine derivatives, tetraazaporphyrazine derivatives, tetraquinoxalyloporphyrazine derivatives, naphthalocyanine derivatives, subphthalocyanine derivatives, pyrylium derivatives, thiopyrylium derivatives, tetraphylline derivatives, anurene derivatives, spiropyran derivatives, spirooxazine derivatives, thiospiropyran derivatives, metal allene complexes and organic ruthenium complexes, furthermore concretely other than these, include dyes and sensitizers described in such as "Dye Handbook" edited by Shin Ogawara et al, (Kodan-sha, 1986), "Chemisry of functional dyes" edited by Shin Ogawara et al, (CMC, 1981), "Special functional materials" edited by Chuzaburo Ikemori et al (CMC, 1986) and Japanese Patent Application No. 7-108045, however, not being limited thereto, and include dyes and sensitizers showing absorption against light of a region from ultra-violet to near-infrared, which may be used alone or optionally in combination of two or more kinds at any mixing ratio.

As a polymerization accelerator, a chain transferring agent, a polymerization inhibitor, an anti-static agent, a surfactant, etc., those exemplified in the aforementioned cushion layer can be used similarly.

As for resins and coating aides, those exemplified in the aforementioned cushion layer can be used similarly.

Further, similar to the case of a cushion layer, may be used in a mixture depending on the object, a dye, an organic and inorganic pigment, oxygen eliminators such as a phosphin, a phosphonate and a phosphite, a reducing agent, an antifogant, an anti-fading agent, anti-halation agent, a fluorescent brightening agent, a coloring agent, a volume increasing agent, a plastisizer, a non-flammable agent, an anti-oxidant, an UV absorbent, a foaming agent, a anti-mold agent, a magnetic substance, additives providing other various characteristics, and a diluent solvent.

<Preparation Method of Thermo-Curable or Photo-Curable Resin Layer>

In case of forming a thermo- or photo-curable resin layer as a protective layer on an image recording material (an image-recorded IC-mounted card substrate), it is preferable to prepare the layer by means of coating method or by use of a transfer foil.

In case of selecting a coating method as a method of forming a protective layer on a image recording material, methods, commonly known in the art, such as rotation coating, wire bar coating, dip coating, felt coating, air-knife coating, spray coating, air-spray coating, static charge air-spray coating, roll coating, blade coating and curtain-flow coating, in which a photo-curable composition is coated, may be utilized. The coating amount in this case varies depending on the usage, and is preferably, for example, 0.05 to 50.0 g/$m^2$ as a solid mass. As the coating amount becomes smaller, the apparent curing speed becomes faster, however, the film characteristics and chemical resistance of the layer is deteriorated.

As a method to cure the layer after being coated, any method generating an active electromagnetic wave (an actinic-ray) can be utilized. An actinic-ray includes the following.

<Actinic-Ray>

Examples include light sources such as a laser, a light emitting diode, a xenon flush lamp, a halogen lamp, a carbon arc lamp, a metal halide lamp, a tungsten lamp, a mercury lamp and an electrodeless light source, and the energy provided therefrom can be suitably selected by adjusting exposure distance, time and intensity, depending on such as the kind of polymerization initiators.

Further, in case of performing the photo-cure by actinic-ray, means to stabilize the photo-cure under a reduced pressure or in a stream of nitrogen may be utilized.

<Thermal treatment>

Thermal energy can be also provided at the cure, and means such as an oven, a heat roll, a hot stamp, a thermal head, a laser light, an infrared flush and a thermal pen can be suitably selected and utilized.

A protective layer comprised of a thermally or photolytically cured resin layer of the invention can be formed by preparing, in advance, a transparent protective layer ribbon or a transparent protective foil which has been formed by coating on a heat resistant support such as a polyethylene terephthalate resin film, and then thermally transferring this, for example, by use of a thermal head and a thermal transfer roll.

<Image Forming Method Onto IC-mounted Card Substrate>

At least one selected from an identification image such as a face image, an attribute information image and a format printing is preferably provided on an IC-mounted card substrate of the invention, and these images are preferably formed on a surface of an image-receiving layer of an IC-mounted card substrate.

An image, which is generally a full-color image having gradation, is prepared, for example, by a sublimation thermal transfer recording method or a silver halide color photographic method. A letter information image, comprises a binary image, and is formed, for example, by a fusion thermal transfer recording method, a sublimation thermal transfer recording method, a silver halide color photographic method, electrophotographic method, or an ink-jet method. In the invention, it is preferable to record an identification image such as a face image and an attribute image by a sublimation thermal transfer recording method.

Attribute information include a name, an address, a birth date, a license, etc., and are recorded, usually as letter information, generally by means of a fusion thermal transfer recording method. A format printing or information recording may also be provided, and this can be formed by any method such as offset printing, gravure printing, silk printing, screen printing, intaglio printing, letterpress printing, an ink-jet method, a sublimation transfer method, an electrophotographic method and a thermal fusion method.

Further, for the purpose of preventing forgery and alteration, an optical variable device described below such as a hologram and a fine structure tint are adopted. A layer to prevent forgery and alteration is optionally selected from a printed matter, a hologram, a bar cord, a matte pattern, a fine structure tint, a ground tint, a seal over two edges and a roughened pattern, and is comprised of a visible light absorbing coloring material, a UV absorbing material, an infrared absorbing material, a fluorescent brightening material, a metal evaporated layer, a glass evaporated layer, a bead layer, an optical variable device layer, a pearl ink layer and a scaly pigment layer.

<Sublimation Image Forming Method>

An ink sheet for sublimation thermal transfer recording can be composed of a support and an ink layer, formed thereon, containing sublimation dyes.

As a support, there is no specific limitation, and those well known in the art, provided being superior in dimensional stability and resistant against heat at the recording with a thermal head, can be used.

A sublimation dye containing ink layer basically contains a sublimation dye and a binder. A sublimation dye described above includes cyan dyes, magenta dyes and yellow dyes.

Cyan dyes include naphthoquinone type dyes, anthraquinone type dyes and azomethine type dyes described in such as JP-A 59-78896, 59-227948, 60-24966, 60-53563, 60-130735, 60-131292, 60-239289, 61-19396, 61-22993, 61-31292, 61-31467, 61-35994, 61-49893, 61-148269, 62-191191, 63-91288, 63-91287 and 63-290793.

Magenta dyes include anthraquinone type dyes, azo type dyes and azomethine type dyes described in such as JP-A 59-78896, 60-30392, 60-30394, 60-253595, 61-262190, 63-5992, 63-205288, 64-159, and 64-63194.

Yellow dyes include methine type dyes, azo type dyes, quinophthalone type dyes and anthraisothiazole type dyes described in such as JP-A 59-78896, 60-27594, 60-31560, 60-53565, 61-12394 and 63-122594.

Specifically preferable sublimation dyes are azomethine dyes obtained by coupling reaction of compounds having an active closed-chain type or open-chain type methylene group, with oxidants of p-phenylenediamine derivatives or those of p-aminophenol derivatives; and indoaniline dyes obtained by coupling reaction of phenol or naphthol derivatives with oxidants of p-phenylenediamine derivatives or those of p-aminophenol derivatives.

Further, when a metal ion containing compound is included in an image-receiving layer, it is preferable to include a sublimation dye that forms a chelate upon reaction with the metal ion containing compound, in a sublimation dye containing ink layer. Examples of the chelate forming sublimation dyes include cyan dyes, magenta dyes and yellow dyes, forming a chelate of at least bidentate, described in JP-A 59-78893, 59-109349, 4-94974, 4-97894 and 4-89292.

Preferable sublimation dyes capable of forming a chelate can be represented by the following general formula:

$$X_1—N═N—X_2\text{-}G$$

where, $X_1$ represents an aromatic carbon ring, in which at least one ring is composed of 5 to 7 atoms, or an atomic group necessary to complete a heterocyclic ring, provided that at least one of the adjacent positions to carbon atoms which bond to the azo bond is a carbon atom substituted by nitrogen atom or a chelating group; $X_2$ represents an heterocyclic ring, in which at least one ring is composed of 5 to 7 atoms, or an aromatic carbon ring; G represents a chelating group.

Any sublimation dyes contained in the sublimation dye containing ink layer above described, may be any of a yellow dye, a magenta dye and a cyan dye when images to be formed are monocolor, and any two dyes out of three dyes above described or other sublimation dyes may be contained depending on the color of the image to be formed. The using amount of sublimation dyes described above generally 0.1 to 20 g, and preferably 0.2 to 5 g, based on 1 $m^2$ of a support.

A binder for the ink layer is not specifically limited, and those well known in the art can be used. Further, in the aforementioned ink layer, various kinds of additives well known in the art can be suitably added.

An ink sheet for use in sublimation thermal transfer recording can be prepared in such a manner that ink layer forming coating solution, which has been prepared by dispersing or solving various ink layer forming components described above is coated on a support and then dried. The thickness of the thus prepared ink layer is generally 0.2 to 10 μm, and preferably 0.3 to 3 μm.

<Manufacturing Method of an IC-Mounted Personal-Data Certification Card by Use of a Transfer Foil>

In the invention, to prepare an certification card by forming such as a protective layer on an IC-mounted card substrate, in addition to the method as described above in which a protective layer is formed by coating, there is a method in which a layer to be a protective layer is once formed on a separate support and then this layer is transferred onto a card substrate to form a functional layer such as a protective layer. The functional layers such as a protective layer once formed on a separate support, which will be transferred onto a card substrate to form such as a protective layer, are referred to as transfer layers (in case of a protective layer, it is referred to as a protective transfer layer) and the materials is called as a transfer foil. According to the method, not only a protective layer but also layers for various purposes can be simultaneously formed by transfer.

<Transfer Foil>

In the invention, a transfer foil applied onto a card substrate is composed of a support and at least a peeling layer, a transparent resin layer as a protective layer (a transparent protective layer) and an adhesive layer. In addition, the foil may optionally contain an intermediate layer, a barrier layer, a primer layer, and the like. Further, an actinic ray-cured resin layer (or a thermally cured resin layer) may be used in addition to or instead of the transparent protective layer. Furthermore, in the invention, prevention of forgery and alteration can be sufficiently performed by an IC-tip, however, it is also possible to provide an optical variable device layer for visual discrimination.

<Support for Transfer Foil>

A support for use in the transfer foil include, for example, single layered sheets of synthetic resin sheets comprised of polyester resins such as polyethylene, polyethylene terephthalate, polybutylene and polyethylene terephthalate-isophthalate copolymer; polyolefin resins such as polyethylene, polypropylene and polymethylpentene; polyfluoroethylene type resins such as polyvinylfluoride, polyvinilidenefluoride, polytetrafluoroethylene and ethylene-ethylenetetrafluoride copolymer; polyamides such as 6-nylon and 6,6-nylon; vinyl polymers such as polyvinylchloride, vinylchloride-vinylacetate copolymer, ethylene-vinyl acetate copolymer, ethylene-vinyl alcohol copolymer, polyvinyl alcohol and vinylon; cellulose type resins such as cellulose triacetate and cellophane; acryl type resins such as polyethyl methaacrylate, polyethyl methaacrylate, polyethyl acrylate and polybutyl acrylate; polystyrene, polycarbanate, polyallylate and polyimide; papers such as wood free paper, thin leaf paper, grassine paper, sulfuric acid paper and a metal foil; and accumulated sheets comprised of two or more layers thereof. The thickness of a support for a transfer foil is 10 to 200 μm, and preferably 15 to 80 μm. When the thickness is not more than 10 μm, the support may be damaged at the transfer process to cause a problem. In the invention, polyethylene terephthalate is preferred.

A support may optionally have a roughened surface. A roughened surface preparation method includes compounding of a matting agent, sand-blast processing, hair-line processing, matte coating and chemical etching. In matte coating, either organic or inorganic substances can be utilized. For example, as inorganic substances, silica described in such as Swiss Patent No. 330,158, glass powder described in such as French Patent No. 1,296,995, and carboxilates of alkali-earth metals or cadmium described in such as British Patent No. 1,173,181 can be used as a matting agent. As organic substances, organic matting agents: for example, starch described in such as U.S. Pat. No. 2,322,037, starch derivatives described in such as Belgian Patent No. 625,451 and British Patent No. 981,198, polyvinyl alcohol described in such as JP-B 44-3643, polystyrene or polymethaacrylate described in such as Swiss Patent No. 330,158, polyacrylonitrile described in such as U.S. Pat. No. 3,079,257 and polycarbonate described in such as U.S. Pat. No. 3,022,169 can be used. The method for attaching a matting agent may be one in which matting agent is dispersed in a coating solution in advance and coated, or one in which, after coating a coating solution and before completion of drying, a matting agent is sprayed. Further, when plural kinds of matting agents are added, the both methods may be utilized in combination. In case of providing a roughening process in the invention, it can be provided on at least one of the transfer surface and the back surface.

<Transfer Foil Peeling Layer>

Peeling layers includes, for example, resins having a high glass transition temperature such as acryl resins, polyvinylacetal resins and polyvinylbutyral resins; waxes; silicone oils; fluoride compounds; resins having aqueous solubility such as polyvinyl pyrrolidone resins, polyvinylalcohol resins, Si-modified polyvinylalcohols, methyl cellulose resins, hydroxy cellulose resins, silicone resins, paraffin waxes, acryl-modified silicone, polyethylene waxes and ethylene vinylacetate; polydimethylsiloxane and modified compounds thereof, and oils, resins and cured compounds thereof, such as polyester-modified silicone, urethane-modified silicone, alkyd-modified silicone, amino-modified silicone, epoxy-modified silicone and polyether-modified silicone. Other fluoride-type compounds include olefin fluoride and phosphateester perfluoride type compounds. Preferable olefin type compounds include dispersions of such as polyethylene and polypropylene and long-chained alkyl type compounds such as polyethyleneimine octadecyl. Those having poor solubility among these mold-releasing agents can be used by such as being dispersed.

When two transfer foil sheets are transferred, thermoplastic elastomers may be added. Examples of thermoplastic elastomers include a styrene type (styrene block copolymer (SBC)), an olefin type (TP), an urethane type (TPU), a polyester type (TPEE), a polyaminde type (TPAE), a 1,2-polybutadiene type, a vinylchloride type (TPVC), a fluoride type, ionomer resins, polyethylenechlorides and silicones; and concretely described in such as "Chemical products of 12996" (Kogyo-Kagaku Nippo Co.).

A thermoplastic elastomer used suitably in the invention, comprising a blockpolymer of polystyrene and polyolefin having not less than 100% of a tensile elongation, refers to a thermoplastic resin comprising the blocks of styrene and straight chain or branching saturated alkyl having not more than 10 carbon atoms (hereinafter, also referred to as thermoplastic resin S1). Specifically, it includes block polymers, having a polystyrene phase and a hydrogenated polyolefin phase, such as block polymers of styrene-butadiene-styrene (SBS), styrene-isoprene-styrene (SIS), styrene-ethylene/butylene-styrene (SEES), styrene-ethylene/propylene-styrene (SEPS) and styrene-ethylene/propylene (SEP).

A thermo-curable resin layer may be used between the peel layer of the invention, and a transparent resin layer (a tranparent protective layer) which becomes a protective layer, or a protective layer comprising an actinic ray-cured resin. Examples of the thermo-curable resin layer include those of polyester resins, acryl resins, epoxy resins, xylene resins, guanamine resins, diallylphthalate resins, phenol resins, polyimide resins, maleic acid resins, melamine resins, urea resins, polyamide resins and urethane resins.

<Transparent Resin Layer>

A transparent resin layer, which becomes a protective layer for the transfer foil, represents polyvinyl butyral resins, polyurethane resins, polyamide resins, polyester resines, epoxy resins and novolak resins; vinyl monomers of styrene, paramethylstyrene, methacrylate esters and acrylate esters, cellulose types, thermoplastic polyesters, natural resins and any other high polymer compounds. Further, organic high polymers well known in the art described in "New Practical Technology of Photo-curable Resins" (by CMC Co., 1987) and "Chemical Products of 10188" pp.657 to 767 (by Nikkan-Kogyo Nippo Co., 1988) may also be used in combination. In the invention, it is preferred to provide a photo- or thermo-curable resin layer, by use of a transfer foil, on an image recording material (an image recorded IC card substrate) for the purpose of protection. A photo- or thermo-curable layer is not specifically limited, as far as it is a material comprised of the composition described above. The thickness of a transparent resin layer is preferably 0.3 to 50 μm, more preferably 0.3 to 30 μm, and specifically preferably 0.3 to 20 μm.

<Intermediate Layer, Primer Layer and Barrier Layer>

An intermediate layer of a transfer foil is preferably composed of at least one intermediate layer, and optionally includes a primer layer and a barrier layer, thereby enhancing adhesion between the layers.

For example, vinylchloride type resins, polyester type resins, acryl type resins, polyvinylacetal type resins, polyvinylbutyral type resins, polyviylalcohols, polycarbonates, cellulose type resins, styrene type resins, urethane type resins, amide type resins, urea type resins, epoxy resins, phenoxy resins, polycaprolactone resins, polyacrylonitrile resins, SEBS resins, SEPS resins and modified substances thereof can be used.

Among resins described above, preferable are vinylchloride type resins, polyester type resins, acryl type resins, polyvinylbutyral type resins, styrene type resins, epoxy resins, urethane type resins, urethaneacrylate resins, SEBS resins and SEPS resins. These resins can be used alone or in combination of two or more kinds thereof.

Examples of the compounds are preferably thermoplastic resins composed of a block-polymer of polystyrene and polyolefin, and polyvinylbutyral. As polyvinylbutyral resins, having a polymerization degree of not less than 1000, used in an intermediate layer, available on the market are S-lec BH-3, BX-1, BX-2, BX-5, BX-55 and BH-S, produced by Sekisui Chemical Ind. Co., Ltd.; and Denkabutyral #4000-2, #5000-A and #6000-EP produced by Denki-Kagaku Ind. Co., Ltd. Thermo-curable resins of polybutyral used in an intermediate layer, may be of a low polymerization degree without limitation of their polymerization degree before the thermal cure, and such as isocyanate hadeners and epoxy hardeners can be utilized for the thermal cure, whose conditions preferably are of a temperature of 0 to 90° C. and a time duration of 1 to 24 hrs. The thickness of an intermediate layer is preferably 0.1 to 1.0 μm.

<Adhesive Layer>

As an adhesive layer of a transfer foil, thermally adhesive resins are used, including ethylene vinylacetate resins, ethylene ethylacrylate resins, ethylene acrylic acid resins, ionomer resins, polybutadiene resins, acryl resins, polystyrene resins, polyester resins, olefin resins, urethane resins, tackiness-providing agent (such as phenol resins, rosin resins, terpene resins and petroleum resins), as well as copolymers and mixed substances thereof. As urethane-modified etylene etylacrylate copolymer, Hytec S-6254, S-6254B and S-3129 produced by Toho Chemical Ind. Co., Ltd. are available on the market, as polyacrylate ester copolymer, Julimer AT-210, AT-510 and AT-613 produced by Nippon-Junyaku Co., Ltd., and Plussize L-201, SR102, SR-103 and J-4 produced by Goo Chemical Co., Ltd., are available on the market. The weight ratio of urethene-modified ethylene acrylate copolymer to polyacrylate ester copolymer is preferably 9:1 to 2:8, and the thickness of an adhesive layer is preferably 0.1 to 1.0 μm.

<Other Layers>

In the IC-mounted personal-data certification card, an optical variable device (OVD) layer can be provided for the purpose of preventing forgery and alteration. The optical variable device represents such as 1) a two-dimensional CG image of diffraction grating such as a kinegram, characterized in that an image composing line images varies by moving freely by transfer, rotation, expansion, contraction, etc., 2) a pixelgram in which an image varies between positive and negative, 3) an OSD (Optical Security Device) wherein color changes from gold to green, 4) a LEDV (Long Lasting Economical Anticopy Device) wherein images appear varied, 5) a stripe type OVD and 6) a metal foil; and security may also be maintained by such as raw materials for a paper sheet, specific printing techniques and specific inks describe in Vol.35 No.6 pp. 482 to 496, Japanese Printing Association Bulletin (1998). Hologram is specifically preferred.

Hologram used in the invention can be arbitrarily selected from, for example, laser reproducible hologram such as relief hologram, Fresnel hologram, Fraunhofer hologram, lens-less Fourier transformation hologram and image hologram; white-light reproducible hologram such as Lippmann hologram and rainbow hologram; color hologram, computer hologram, hologram display, multi-flex hologram, hologram-flex stereogram and holographic diffraction grating.

An optical variable device layer, for example, can be formed by adhering a hologram sheet on an image-receiving layer. As a hologram sheet, a relief type hologram sheet can be used. A relief type hologram sheet comprises a hologram forming layer and a hologram effectuating layer being accumulated on a support in this order. Exemplarily, a hologram sheet can be obtained by forming a resin layer which is solid at ordinary temperatures and has thermal forming property as well, for example, an electron-beam curable resin layer (a hologram forming layer), on a support film such as a polyethylene terephthalate film; a hologram original form having a holographic interference pattern in the form of a roughened surface being compressed with pressure thereon to transfer the roughened pattern onto the resin surface, and being cured; and further forming a thin hologram effectuating layer, composed of a material having a sufficient transparency as well as a large reflectability at a certain angle and a refractive index different from that of the hologram forming layer (for example, an evaporated film of $TiO_2$, $SiO_2$ or ZnS) on the roughened surface.

The hologram, in which images are reproduced with a white light such as daylight and illumination light, is superior in decorativeness because hologram images are visible under ordinary conditions. On the other hand, the hologram, in which images are reproduced by laser light, is superior in detection of falsification.

Further, in the invention, a bead-holding layer can be provided, and a bead-holding layer having beads according to the invention, reconstitutes the incident light by adding a phase difference to a part of the incident light, emphasizes a light component of a specific wavelength region by interference to return light different in color from the incident light to the incoming direction of incident light; and comprises a reflection substrate and transparent beads regularly placed thereon.

The bead-holding layer having beads composes a reflection substrate provided with a resin layer thereon, and many beads, made of such as glass and having a bead diameter of 10 to 60 $\mu$m, and preferably of 15 to 40 $\mu$m, are further arranged on the outermost surface side. The light refractive index of the bead is preferably 1.6 to 2.1, and more preferably 1.7 to 2.0. The incident light incoming from outside proceeds into the bead, at least a part of the light being reflected by the reflection substrate through the transparent bead and resin layer, returns to the bead again and proceeds to outside. Because the outwardly extruding surface of the bead is spherical, similar function is effected regardless of some variation of the incident angle and the reflected light can be returned to the incident direction.

Next, in the invention, a reflection layer can be provided, and the reflection layer is preferably formed by printing, in arbitrary tint patterns, a paint including a powder such as interferential substances, metal oxides and mica, capable of exhibiting an interference color.

Examples of metal oxides include titanium dioxide, ferric oxide, titanium lower-order oxide, zirconium oxide, silicon oxide, aluminum oxide, cobalt oxide, nickel oxide and cobalt titanate; complex oxides such as $Li_2CoTi_3O_8$ and $KNiTiO_x$; and mixed substances of these metal oxides, however, are not limited to these, as far as they are metal oxides capable of exhibiting an interference color. As an interference substance layer, a metal film, having an interference color obtained by oxidizing the surface thereof, can be used. Methods to prepare these metal film include a method in which films of such as aluminum metal, titanium metal and stainless steel are anodically oxidized; a method in which a metal oxide capable of exhibiting interference color is prepared by a sol-gel method and coated; a method in which an alkoxide of metal capable of exhibiting interference color is coated on a metal film and thermally decomposed; and evaporation process such as a CVD and a PVD.

There are shown below exemplary examples of a transparent protective transfer foil, including a transparent protective transfer layer to form a transparent protective layer; an optical variable device transfer foil, including an optical variable device transfer layer to form an optical variable device layer; a curable transfer foil, including a curable protective layer containing transfer layer to form a (actinic-ray) curable layer as one embodiment of a transparent resin layer which is prefarable as a protective layer; and a curable resin layer containing optical variable device transfer foil, including a curable resin layer containing optical variable device layer to form a curable resin layer and an optical variable device layer.

First, embodiments of a transparent protective transfer foil 64 are shown in FIGS. 5-(1) to 5-(4). A transparent protective transfer foil 64 in FIG. 5-(1) is composed of a transparent protective transfer layer 640 and a support 64*b*; wherein the transparent protective transfer layer 640 is composed of a mold releasing layer 64*a*1, a transparent protective layer 64*a*2 and an adhesive layer 64*a*3, the mold-releasing layer 64*a*1 and the adhesive layer 64*a*3 being provided on the both sides of the transparent protective layer 64*a*2, and the mold-releasing layer 64*a*1 being adhered to the support 64*b*. A transparent protective transfer foil 64 in FIG. 5-(2) is composed similarly to the transfer foil in FIG. 5-(1), however, an intermediate layer 64*a*4 is provided between the transparent protective layer 64*a*2 and the adhesive layer 64*a*3. A transparent protective transfer foil 64 in FIG. 5-(3) is composed similarly to the transfer foil in FIG. 5-(2), however, two of the transparent protective layers 64*a*2 are provided. A transparent protective transfer foil 64 in FIG. 5-(4) is composed similarly to the transfer foil in FIG. 5-(2), however, a barrier layer 64*a*5 is provided between the transparent protective layer 64*a*2 and the intermediate layer 64*a*4.

By using these transparent protective transfer foils 64, the transparent protective transfer layer 640 is peeled from the support 43*b* and transferred to an IC card substrate.

Embodiment of an optical variable device transfer foil 43 are shown in FIGS. 6-(1) to 6-(4). An optical variable device transfer foil 43 in FIG. 6-(1) is composed of an optical variable device transfer layer 430 and a support 43*b*; wherein the optical variable device transfer layer 430 is composed of a mold releasing layer 43*a*1, an optical variable device layer 43*a*2 and an adhesive layer 43*a*3, the mold-releasing layer 43*a*1 and the adhesive layer 43*a*3 being provided on the both sides of the optical variable device layer 43*a*2, and the mold-releasing layer 43*a*1 being adhered to the support 43*b*. An optical variable device transfer foil 43 in FIG. 6-(2) is composed similarly to the transfer foil in FIG. 6-(1), however, an intermediate layer 43*a*4 is provided between the adhesive layer 43*a*3 and the optical variable device layer 43*a*2. An optical variable device transfer foil 43 in FIG. 6-(3) is composed similarly to the transfer foil in FIG. 6-(2), however, a barrier layer 43*a*5 is provided between the optical variable device layer 43*a*2 and the intermediate layer 43*a*4. A transfer foil 43 in FIG. 6-(4) is composed similarly to the transfer foil in FIG. 6-(3), however, a protective layer 43*a*6 is provided between the mold-releasing layer 43*a*1 and the optical variable device layer 43*a*2.

By using these optical variable device transfer foils 43, the optical variable device transfer layer 430 is transferred to an IC card substrate by being pealed off from the support 43*b*.

Next, embodiments of a curable transfer foil 66 are shown in FIGS. 7-(1) to 7-(3). A curable transfer foil 66 shown in FIG. 7-(1) is composed of a curable protective layer containing transfer layer 660 and a support 66*b*; wherein, the curable protective layer containing transfer layer 660 is composed of a mold releasing layer 66*a*1, an intermediate layer 66*a*4 and an adhesive layer 66*a*3, the mold-releasing layer 66*a*1 and the intermediate layer 66*a*4 being provided on the both sides of the curable layer 66*a*2, and the mold-releasing layer 66*a*1 being adhered to the support 66*b*. A curable transfer foil 66 shown in FIG. 7-(2) is composed similarly to the transfer foil in FIG. 7-(1), however, two of the curable layers 66*a*2 are provided. A curable transfer foil 66 in FIG. 7-(3) is composed similarly to the transfer foil in FIG. 7-(1), however, a barrier layer 66*a*5 is provided between the adhesive layer 66*a*3 and the intermediate layer 66*a*4.

By using these curable transfer foils 66, the curable protective layer containing transfer layer 660 is transferred to an IC card substrate by being pealed off from the support 66*b*.

Next, embodiments of a curable resin layer containing optical variable device transfer foil 44 are shown in FIGS. 8-(1) to 8-(3). A curable resin layer containing optical variable device transfer foil 44 in FIG. 8-(1) is composed of a curable resin layer containing optical variable device transfer layer 440 and a support 44*b*; wherein, the curable resin layer containing optical variable device transfer layer 440 is composed of a mold-releasing layer 44*a*1, a curable layer 44*a*9, an optical variable device layer 44*a*2, an intermediate layer 44*a*4, a barrier layer 44*a*5 and an adhesive layer 44*a*3, and the mold-releasing layer 44*a*1 is adhered to the support 44*b*. A curable resin layer containing optical variable device transfer foil 44 shown in FIG. 8-(2) is composed similarly to the transfer foil in FIG. 8-(1), however, an intermediate layer 44*a*4 is absent. Further, a curable resin layer containing optical variable device transfer foil 44 in FIG. 8-(3) is composed similarly to the transfer foil in FIG. 8-(1), however, a barrier layer 44*a*5 is absent.

By using these curable resin layer containing optical variable device transfer foils 44, the curable resin layer containing optical variable device transfer layer 440 is transferred to an IC card substrate by being pealed off from the support 44*b*.

The curable resin layer containing optical variable device transfer foils 44 of the embodiment; wherein the curable resin layer containing optical variable device transfer layers 440 are transferred by being pealed off from the supports 44*b*, and the curable resin layer containing optical variable device transfer layer 440 is composed of at least a mold releasing layer, a curable layer, an optical variable device layer, an intermediate layer and an adhesive layer; by being transferred to a card substrate, achieves superior surface protection and surface wear resistance of an IC-mounted personal-data certification card.

Further, the transparent protective layer, which is placed at the side closer to the surface than the optical variable device layer of an image recording material (an IC-mounted card substrate images has been recorded thereon), is preferably a cured layer by actinic-ray such as UV-light or electron beam to achieve superior surface protection and to enhance surface wear resistance.

Further, the optical variable device layer is preferably a hard-coat layer or an evaporated layer having relief images, because it is effective to prevent forgery and alteration.

Further, at least one transparent protective layer being thermally transferred to a card to cover the whole surface is preferred to achieve superior surface protection and surface wear resistance.

Furthermore, an anti-static agent is preferably contained in either of a transparent protective transfer layer or an optical variable device transfer layer, to prepare a card or sheet free of dust attraction.

Further, the surface transferred previously is preferably subjected to an adhesion enhancement process against the transfer foil to follow, to achieve superior adhesion.

In a transfer foil of the invention, at least each one layer of an anti-static layer, a mold releasing layer, a transparent protective layer, an optical variable device layer, a barrier layer, an intermediate layer and an adhesive layer is preferably provided. An anti-static layer of the transfer foil contains an anionic polymer compound having a superior anti-static property and/or electric conductive grains.

<Method of Providing a Transfer Foil Onto an Image Recording Material>

To transfer each layer of the transfer foil by using these transfer foils onto an IC-mounted card substrate, that is a material receiving transferred layers thereon, means, in which can provide pressure while heating, such as a thermal head, a heat roll and a hot stamp machine are utilized.

A method of preparing an IC-mounted personal-data certification card, by forming layers such as a protective layer on an IC mounted card substrate, on which images has been formed, by use of the transfer foils described above, will be explained based on the drawings below; however, the invention is not limited to the explanation and drawings of the embodiments.

Figure 9:
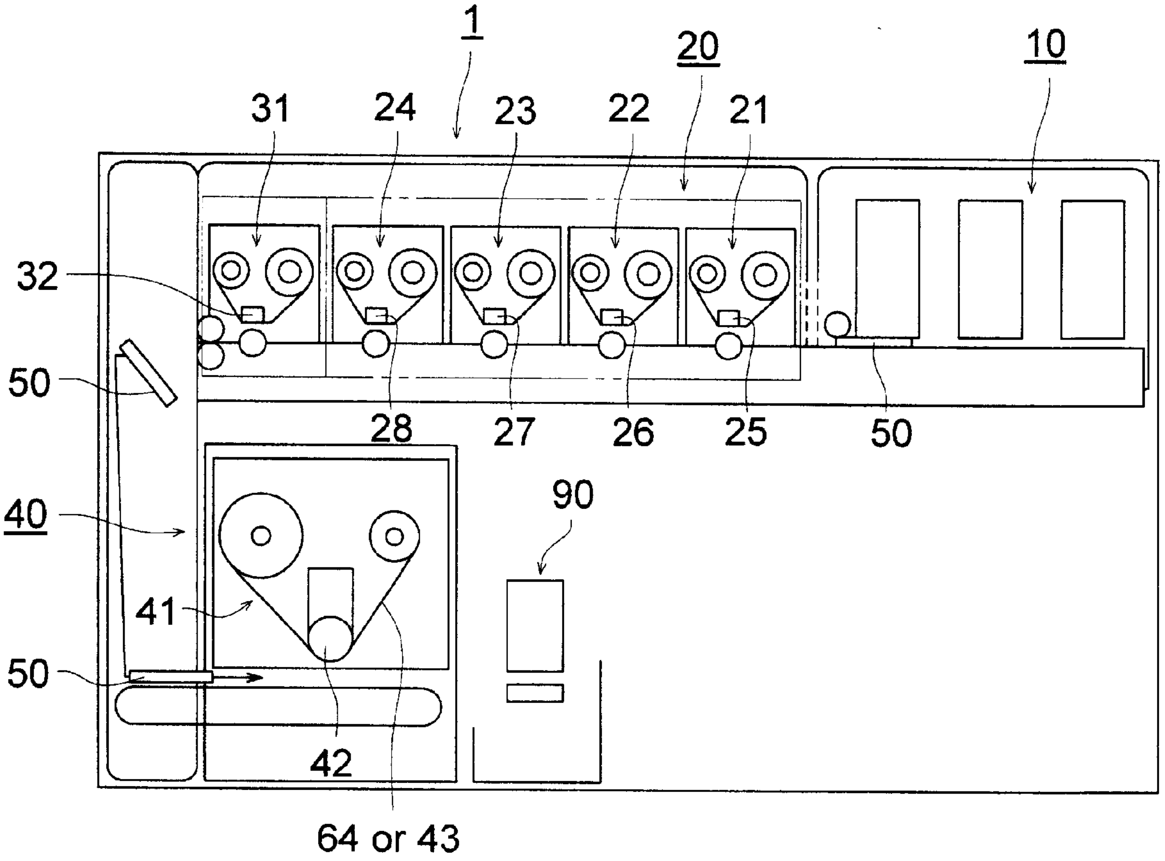
FIG. 9 is a brief configuration drawing of an image recording material preparation apparatus.
Figure 10:
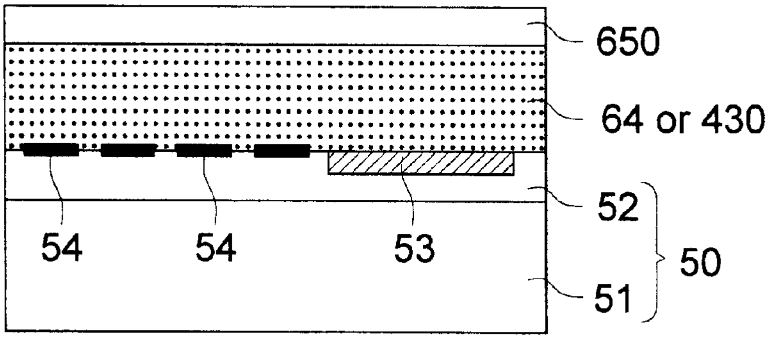
FIG. 10 is a drawing showing a layer composition of an image recording material.

First, FIG. 9 is a schematic illustration of a preparation apparatus of an image recording material, and FIG. 10 shows a layer configuration of an image recording material (an IC-mounted personal-data certification card).

In the preparation apparatus 1 of an image recording material of FIG. 9, in which an IC-mounted card substrate supplying section 10 and an information recording section 20 are arranged in upper position, and a transparent protective layer providing section or an optical variable device transfer layer providing section 40, and an actinic-ray curable layer providing section and/or an actinic-ray irradiation section 90 are arranged in lower position, an IC-mounted personal-data certification card is prepared.

In the IC-mounted card supplying section 10, plural sheets of an IC card substrate 50, which have been cut into a card form in advance so as to be written with personal information of a card user, are stocked with the surfaces of recording a face picture upward. In this example, an IC card substrate 50 (actually, comprised of the first sheet member and the second sheet member) is shown simplified as to be comprised of a support 51 and an image-receiving layer 52. The card substrate 50 is automatically supplied by one from the card substrate supplying section 10 at a predetermined timing.

In the information recording section 20, a yellow ribbon cassette 21, a magenta ribbon cassette 22, a cyan ribbon cassette 23 and a black ribbon cassette 24 are arranged, and recording heads 25 to 28 corresponding to each color cassette are arranged. An image region 53 having gradation such as a face picture of a card user is recorded into the predetermined region of the image-receiving layer 52, while the card substrate 50 is being transported, by thermal transfer with thermal transfer sheets such as a yellow ribbon, a magenta ribbon and a cyan ribbon. Further, a letter ribbon cassette 31 and a recording head 32 are arranged, and identification information 54 such as the name and the card issue date are recorded, by thermal transfer with thermal transfer sheets such as a letter ribbon, to form an image recorded layer.

In a transparent protective layer providing section or an optical variable device transfer layer providing section 40, a transfer foil cassette 41 is arranged and a thermal transfer head is arranged corresponding to this transfer foil cassette. A transparent protective transfer layer 640 or an optical variable device transfer layer 430 is provided by thermally transferring a transparent protective transfer foil 64 or an optical variable device transfer foil 43.

Then, an actinic-ray curable solution is coated and exposed to actinic-ray, at an actinic-ray curable layer providing section and/or an actinic-ray irradiating section 90, to obtain the layer composition of the image recording material having a composition of FIG. 2, and the actinic ray-cured resin layer 650 is provided on the transparent protective transfer layer or the optical variable device transfer layer 430.

Figure 11:
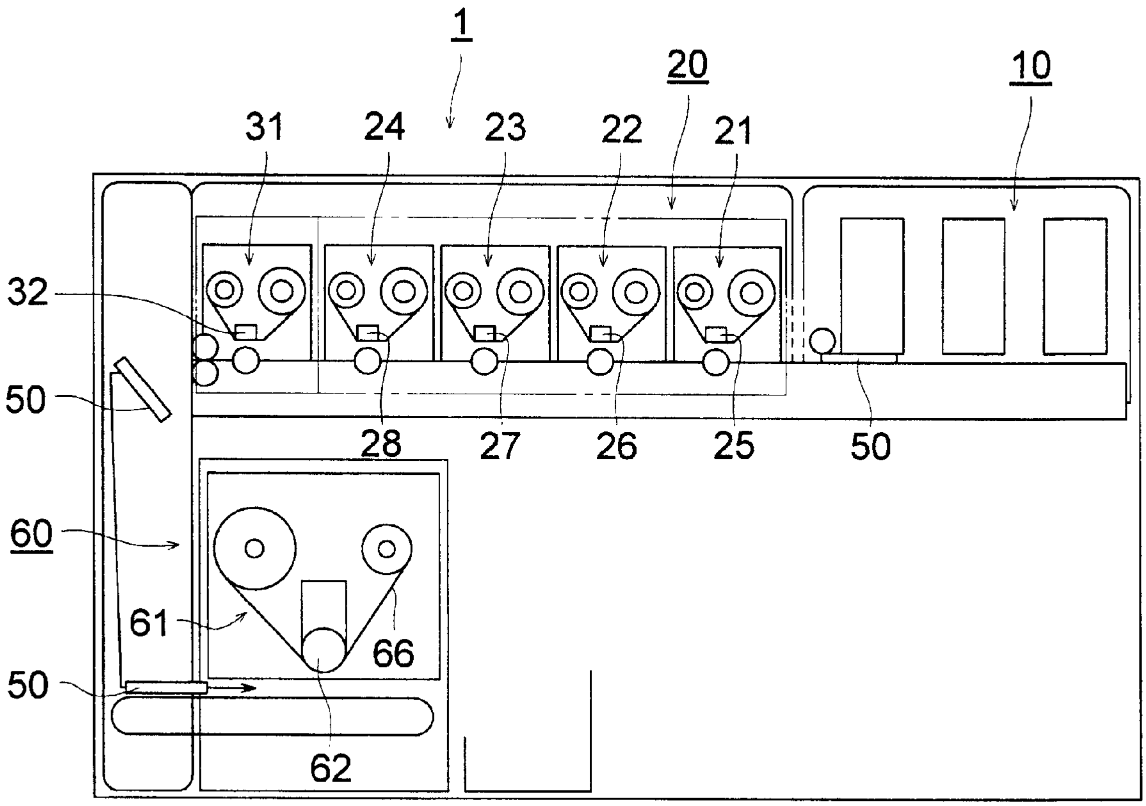
FIG. 11 is a brief configuration drawing of an image recording material preparation apparatus.
Figure 12:
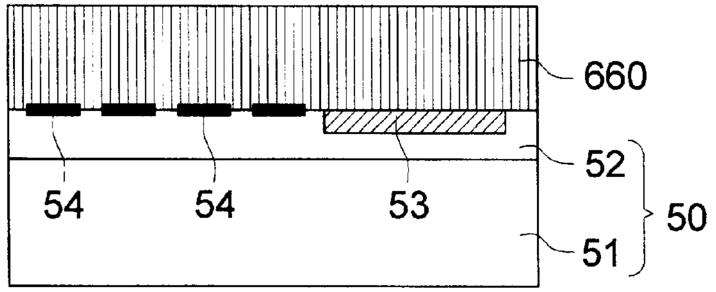
FIG. 12 is a drawing showing a layer configuration of an image recording material.

Next, the second embodiment is shown in FIG. 11 and FIG. 12, wherein FIG. 11 shows a brief configuration drawing of a preparation apparatus of an image recording material (an IC-mounted personal-data certification card) and FIG. 12 shows a layer configuration of an image recording material (an IC-mounted personal-data certification card).

In the preparation apparatus 1 of an image recording material, an IC-mounted card substrate supplying section 10 and an information recording section 20 are arranged similarly, however, an curable protective layer-containing transfer layer-providing section 60 is arranged next to the information recording section.

In the curable protective layer containing transfer layer providing section 60, a transfer foil cassette 61 is arranged and a thermal transfer head 62 is arranged corresponding to the transfer foil cassette 61. A curable transfer foil 66 is set in the transfer foil cassette 61, and a curable protective layer-containing transfer layer 660 is provided by transferring the curable transfer foil 66.

Figure 13:
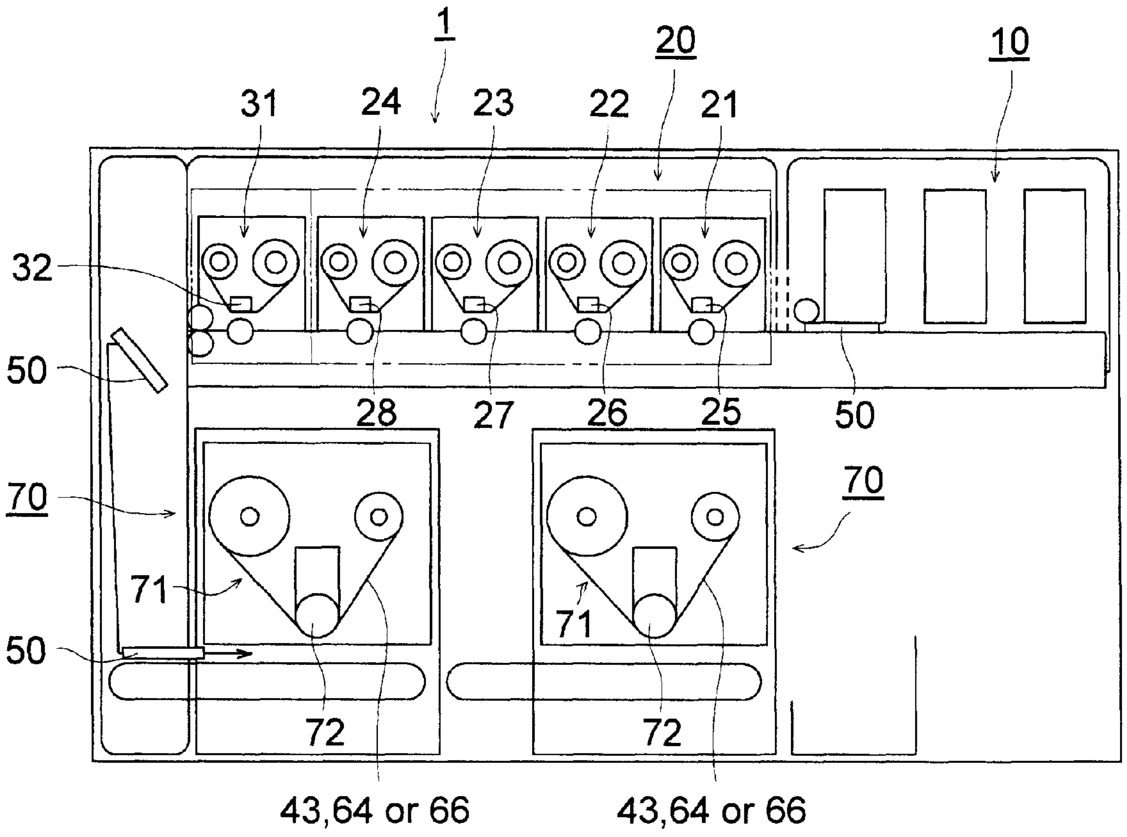
FIG. 13 is a brief configuration drawing of an image recording material preparation apparatus.
Figure 14:
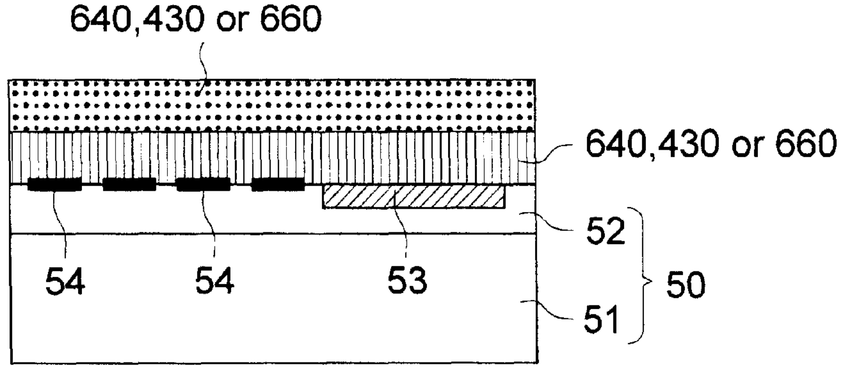
FIG. 14 is a drawing showing a layer configuration of an image recording material.

Next, the third embodiment is shown in FIG. 13 and FIG. 14, wherein FIG. 13 shows a schematic illustration of a preparation apparatus of an image recording material (an IC-mounted personal-data certification card) and FIG. 14 shows a layer configuration of an image recording material (an IC-mounted personal-data certification card).

In the preparation apparatus 1 of an image recording material (an IC-mounted personal-data certification card) of this embodiment, an IC-mounted card substrate supplying section 10 and an information recording section 20 are arranged similarly, however, a transparent protective transfer layer and optical variable device transfer layer providing section or a curable protective layer-containing transfer layer-providing section 70 is arranged, and the similar transparent protective transfer layer and optical variable device transfer layer providing section or a curable protective layer-containing transfer layer-providing section 70 is further arranged thereafter.

For example, a transparent protective layer transfer foil 64 or an optical variable device transfer foil 43 are set in the cassette 71 at the first transparent protective transfer layer and optical variable device transfer layer providing section or a curable protective layer containing transfer layer providing section 70; and a transparent protective transfer layer and an optical variable device transfer layer can be formed with the thermal transfer head 72 corresponding to the transfer foil cassette 71; followed by providing a curable protective layer containing transfer layer 660 at another transparent protective transfer layer and optical variable device transfer layer providing section or a curable protective layer containing transfer layer providing section 70.

Further, by reversing the layer arrangement order, a reversed arrangement of a transparent protective transfer layer or an optical variable device transfer layer and a curable protective layer containing transfer layer, can be achieved.

EXAMPLES

The present invention will be described below, based on examples, but the embodiment of the invention is not limited thereto. Hereinafter, "part(s)" represents "part(s) by weight".

<Preparation of First Sheet Member (Back-Side Sheet)>

U2L98W-100 low thermal shrinkage grade produced by Teijin Dupont Film Co., Ltd. was used as the first support of the first sheet member.

Preparation of Writable Layer

The first writable layer coating solution, the second writable layer coating solution and the third writable layer coating solution, whose compositions are shown below, were coated in this order on the second support (75 μm thick) and dried so as to have a dry layer thickness of 5 μm, 15 μm and 0.2 μm, respectively, to form a writable layer.

| | |
|---|---|
| First writable layer forming coating solution | |
| Polyester resin (Product of Toyoboseki Co., Ltd.: Vilon 200) | 8 parts |
| Isocyanate (Product of Nippon Urethane Ind. Co., Ltd.: Colonate HX | 1 part |
| Carbon Black | a slight amount |
| Titanium dioxide particles (Product of Ishihara-Sangyo Co., Ltd.: CR80) | 1 part |
| Methyl etyl ketone | 80 parts |
| Butyl acetate | 10 parts |
| Second writable layer forming coating solution | |
| Polyester resin (Product of Toyoboseki Co., Ltd.: Vilonal MD1200) | 4 parts |
| Silica | 5 parts |
| Titanium dioxide particles (Product of Ishihara-Sangyo Co., Ltd.: CR80) | 1 part |
| Water | 90 parts |
| Third writable layer forming coating solution | |
| Polyamide resin (Product of Sanwa Chemical Ind. Co., Ltd.: Sanmide 55) | 5 parts |
| Methanol | 95 parts |

The mean center-line roughness of the thus obtained writable layer obtained was 1.34 μm.

<Preparation of the Second Sheet Member (Front-Surface Sheet)>

U2L98W-100 low thermal shrinkage grade produced by Teijin Dupont Film Co., Ltd. was used as the second support of the second sheet member.

A cushion layer, an image-receiving layer and a cushioning image-receiving layer comprised of compositions described in Table 1 were coated on the second support (100 μm thick) in the order as shown Table 2 and dried to prepare a multi-layered front-surface sheet configuration. (In Table 2, were shown the Nos. of each used coating composition of a cushion layer, an image-receiving layer and a cushion image-receiving layer.)

TABLE 1

| No. | Composition | Weight % | Layer thickness (μm) | Remarks |
|---|---|---|---|---|
| 1 | Urethane acrylate oligomer (Product of Shin-Nakamura Chemicals Co.: UA512) | 55 | 10.0 | Inventive photo-curable cushion layer |
| | Polyester acrylate (Product of Toagosei Co., Ltd.: M6200) | 15 | | |
| | Urethane acrylate olygomer (Product of Shin-Nakamura Chemicals Co.: UA4000) | 25 | | |
| | Hydroxycyclohexyl phenylketone (produced by Ciba Specialty | 5 | | |

TABLE 1-continued

| No. | Composition | Weight % | Layer thick-ness (μm) | Remarks |
|---|---|---|---|---|
| | Chemicals Co., Ltd.: Irgacure 184) | | | |
| | Methyl ethyl ketone | 100 | | |
| 2 | Actinic ray-curable resin (Product of Toagosei Co., Ltd.: UV3810) | 8 | 10.0 | Inventive photo-curable cushion layer |
| | Polybutyl acrylate: Mw = 50,000 | 2 | | |
| | Methyl ethyl ketone | 100 | | |
| 3 | Actinic ray-curable resin (Product of Toagosei Co., Ltd.: UV3810) | 9 | 10.0 | Inventive curable cushion layer |
| | Nipporane N5230 (Product of Nippon Urethane Co., Ltd.) | 1 | | |
| | Toluene | 100 | | |
| 4 | Actinic ray-curable resin (Product of Toagosei Co., Ltd.: UV3810) | 8 | 10.0 | Inventive photo-curable cushion layer |
| | Epofriend A1020 (Product of Daicel Chemical Ind. Co., Ltd.) | 2 | | |
| | Toluene | 100 | | |
| 5 | Actinic ray-curable resin (Product of Toagosei Co., Ltd.: UV3810) | 8 | 10.0 | Inventive photo-curable cushion layer |
| | Highbon 9071 (Product of Hitachi-Kasei Polymer Co., Ltd.) | 2 | | |
| | Toluene | 100 | | |
| 6 | Pentaerythritol diacrylate | 2 | 10.0 | Photo-curable non-cushion layer |
| | Urethane acrylate olygomer (Product of Shin-Nakamura Chemicals Co.: UA5201) | 3 | | |
| | Hydroxycyclohexyl phenylketone (Product of Ciba Specialty Chemicals Co., Ltd.: Irgacure 184) | 5 | | |
| | Methyl ethyl ketone | 100 | | |
| 7 | Nipporan N5230 (produced by Nippon Urethane Co.) | 50 | 10.0 | Non-curable cushion layer |
| | Toluene | 50 | | |
| 8 | Polypropyrene (PP) | 1.8 | 10.0 | Non-curable cushion layer |
| 9 | Polyvinylbutyral resin (Product of Sekisui Chemical Ind. Co., Ltd.: S-lec BL-1) | 9 | 0.2 | Image-receiving layer |
| | Isocyanate (Product of Nippon Urethane Ind. Co., Ltd.: Colonate HX) | 1 | | |
| | Methyl ethyl ketone | 80 | | |
| | Butyl acetate | 10 | | |
| 10 | Polyvinylbutyral resin (Product of Sekisui Chemical Ind. Co., Ltd.: S-lec BX-1) | 6 | 2.5 | Image-receiving layer |
| | Metal ion containing compound (Compound MS) | 4 | | |
| | Methyl ethyl ketone | 80 | | |
| | Butyl acetate | 10 | | |
| 11 | Polyethylene wax (Product of Toho Chemical Ind. Co., Ltd.: Hytec E1000) | 2 | 0.5 | Image-receiving layer |
| | Urethane-modified ethylene-acrylic acid copolymer (Product of Toho Chemical Ind. Co., Ltd.: Hytec S6254) | 8 | | |
| | Methyl cellulose (Product of Shinetsu Chemical Ind. Co., Ltd.: SM15) | 0.1 | | |
| | Water | 90 | | |
| 12 | Urethane acrylate oligomer (Product of Shin-Nakamura Chemicals Co.: UA512) | 3.2 | 5.0 | Inventive actinic ray-curable cushioning image-receiving layer |
| | Polyester acrylate (Product of Toagosei Co., Ltd.: M6200) | 1.6 | | |
| | Urethane acrylate olygomer (Product of Shin-Nakamura Chemicals Co.: UA4000) | 0.2 | | |
| | Hydroxycyclohexyl phenylketone (Product of Ciba Specialty Chemicals Co., Ltd.: Irgacure 184) | 1 | | |
| | Metal ion containing compound (compound MS) | 4 | | |
| | Methyl ethyl ketone | 100 | | |
| 13 | Photocurable resin (Product of Toagosei Co., Ltd.: UV3810) | 4 | 5.0 | Inventive actinic ray-curable cushioning image-receiving layer |
| | Polybutyl acrylate: Mw = 50,000 | 2 | | |
| | Metal ion containing compound (compound MS) | 4 | | |
| | Methyl ethyl ketone | 100 | | |
| 14 | Actinic ray-curable resin (Product of Toagosei Co., Ltd.: UV3810) | 5 | 5.0 | Inventive actinic ray-curable cushioning image-receiving layer |
| | Nipporan N5230 (Product of Nippon Urethane Co., Ltd.) | 1 | | |
| | Metal ion containing compound (compound MS) | 4 | | |
| | Toluene | 100 | | |
| 15 | Actinic ray-curable resin (Product of Toagosei Co., Ltd.: UV3810) | 5.5 | 5.0 | Inventive actinic ray-curable cushioning image-receiving layer |
| | Epofriend A1020 (Product of Daicel Chemical Ind. Co., Ltd.) | 0.5 | | |
| | Metal ion containing compound (compound MS) | 4 | | |
| | Toluene | 100 | | |
| 16 | Actinic ray-curable resin (Product of Toagosei Co., Ltd.: UV3810) | 4 | 5.0 | Inventive actinic ray-curable cushioning image-receiving layer |
| | Hot-melt adhesive of the invention (Highbon 9071) (Produced of Hitachi-Kasei Polymer Co., Ltd.) | 2 | | |
| | Metal ion containing compound (compound MS) | 4 | | |
| | Toluene | 100 | | |
| 17 | Pentaerythritol diacrylate | 2 | 5.0 | Actinic ray-curable non-cushion layer |
| | Urethane acrylate olygomer (Product of Shin-Nakamura Chemicals Co.: UA5201) | 3 | | |
| | Hydroxycyclohexyl phenylketone (Product of Ciba Specialty Chemicals Co., Ltd.: Irgacure 184) | 5 | | |
| | Methyl ethyl ketone | 100 | | |
| 18 | Pentaerythritol diacrylate | 1.8 | 5.0 | Actinic ray-curable non-cushion layer |
| | Urethane acrylate olygomer (Product of Shin-Nakamura Chemicals Co.: UA5201) | 2.7 | | |
| | Hydroxycyclohexyl phenylketone (Product of Ciba Specialty Chemicals Co., Ltd.: Irgacure 184) | 1 | | |
| | Metal ion containing compound (compound MS) | 4 | | |
| | Methyl ethyl ketone | 100 | | |

Compound MS

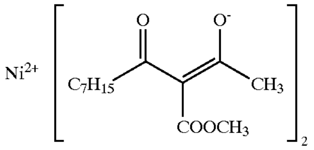

<Format Printing>

A logotype and OP varnish were printed successively on the image-receiving layer of the front-surface sheet accumulated composition prepared above by a resin letterpress printing method.

<Preparation of an IC-Mounted Card Substrate and an IC-Mounted Card Substrate Provided with an Image-Receiving Layer>

Using the multi-layered front-surface sheet configuration printed above, and by the use of the preparation apparatus of an IC-mounted card substrate and an IC-mounted card substrate attached with an image-receiving layer, described above in FIG. 4, in which the first sheet member (a back-side sheet) being set in the first sheet supplying section, the second sheet member (a front-side sheet) being set in the second sheet supplying section; Macroplast QR3460 produced by Henkel Co. was charged in the hot-melt adhesive supplying section and coated on the first or the second sheet member so as to make a wet coated amount of 100 μm, and an IC fixing material was assembled as a IC/fixing layer, to obtain raw materials of an IC-mounted card substrate and an IC-mounted card substrate attached with an image-receiving layer. After confirming the adhesive was cured, a logotype and bibliographic items were printed on the first sheet member side (a back-side sheet) by a resin letterpress printing method. Thereafter, an IC-mounted card substrate of 55 mm×85 mm in size was prepared by finish cutting through a roll cutter. IC-mounted card substrate Nos. 1 to 31 were obtained using a various kinds of front side sheet accumulated compositions shown in Table 2 as the second sheet members. In Table 2 the composition of each IC-mounted card substrate is corresponded to the compositions of an IC-mounted card substrate described in FIGS. 1-(1) to 1-(12).

TABLE 2

| IC-mounted card substrate No. | IC-mounted card configuration | Front side sheet layer configuration: Cushion layer | Image-receiving layer configuration (multilayered from the left) | | | Displacement value of penetration in cushion layer (%) 100° C. | 150° C. |
|---|---|---|---|---|---|---|---|
| 1 | 1-(2) | 1 | 9 | 10 | 11 | 10 | 64 |
| 2 | 1-(2) | 2 | 9 | 10 | 11 | 12 | 78 |
| 3 | 1-(2) | 3 | 9 | 10 | 11 | 19 | 72 |
| 4 | 1-(2) | 4 | 9 | 10 | 11 | 9 | 80 |
| 5 | 1-(2) | 5 | 9 | 10 | 11 | 21 | 86 |
| 6 | 1-(5) | 7 | 12 | | | 19 | 90 |
| 7 | 1-(5) | 7 | 14 | | | 22 | 100 |
| 8 | 1-(5) | 7 | 15 | | | 15 | 90 |
| 9 | 1-(7) | 1 | 12 | 11 | | 20 | 95 |
| 10 | 1-(7) | 2 | 13 | 11 | | 25 | 100 |
| 11 | 1-(7) | 4 | 15 | 11 | | 17 | 85 |
| 12 | 1-(6) | — | 12 | | | 9 | 58 |
| 13 | 1-(6) | — | 13 | | | 5 | 68 |
| 14 | 1-(6) | — | 14 | | | 5 | 71 |
| 15 | 1-(6) | — | 15 | | | 1 | 55 |

TABLE 2-continued

| IC-mounted card substrate No. | IC-mounted card configuration | Front side sheet layer configuration: Cushion layer | Image-receiving layer configuration (multilayered from the left) | | | Displacement value of penetration in cushion layer (%) 100° C. | 150° C. |
|---|---|---|---|---|---|---|---|
| 16 | 1-(6) | — | 16 | | | 9 | 73 |
| 17 | 1-(7) | 1 | 12 | | | 22 | 71 |
| 18 | 1-(7) | 2 | 13 | | | 21 | 100 |
| 19 | 1-(7) | 3 | 14 | | | 25 | 78 |
| 20 | 1-(7) | 4 | 15 | | | 21 | 100 |
| 21 | 1-(7) | 5 | 16 | | | 28 | 100 |
| 22 | 1-(10) | | 17 | | | 0 | 18 |
| 23 | 1-(10) | | 18 | | | 0 | 15 |
| 24 | 1-(11) | 6 | 9 | 10 | 11 | 2 | 23 |
| 25 | 1-(11) | 7 | 9 | 10 | 11 | 2 | 19 |
| 26 | 1-(11) | 8 | 9 | 10 | 11 | 0 | 3 |
| 27 | 1-(11) | 6 | 17 | | | 0 | 5 |
| 28 | 1-(11) | 7 | 18 | | | 0 | 6 |
| 29 | 1-(11) | 8 | 18 | | | 0 | 0 |
| 30 | 1-(12) | — | 17 | | | 0 | 2 |
| 31 | 1-(12) | — | 18 | | | 0 | 2 |

The cushion layers comprised of an actinic ray-curable resin, as described above were cured at 80° C. and 300 mJ/cm$^2$.

The results of needle penetration displacement values of the cushion layers of the IC-mounted card substrate Nos. 1 to 31, each measured at 100° C. and 150° C., are shown at the same time in Table 2.

The actinic ray-cured cushion layer was prepared by photo-curing under conditions of 80° C. and 300 mJ/cm$^2$.

Herein, in the measuring method of a needle penetration displacement value using a thermo-mechanical analysis, samples were cut into a size of 4×4 mm$^2$ in size after a cushion layer was coated and formed on the second sheet member, and the penetration displacement values at 100° C. and 150° C. based on the layer thickness were measured by use of a thermomechanical analysis apparatus (ThermoFlex, produced by Rigaku-Denki Co.).

<Preparation of an IC-Mounted Personal-Data Certification Card>

Preparation of Ink Sheets for Sublimation Thermal Transfer Recording

Ink sheets of three colors of yellow, magenta and cyan were obtained by providing a yellow ink layer coating solution, a magenta ink layer coating solution and a cyan ink layer coating solution of the following compositions on a polyethylene terephthalate sheet of 6 μm thick, the back-side thereof being subjected to anti-melt-adhesion treatment, so as to make each thickness of 1 μm.

| <Yellow ink layer forming coating solution> | |
|---|---|
| Compound (Y-1) | 3 parts |
| Polyvinylacetal (Product of Denki-Kagaku Ind. Co., Ltd.: Denkabutyral KY-24) | 5.5 parts |
| Polymethyl methacrylate modified polystyrene (Product of Toa-Goseikagaku Ind. Co., Ltd.: Lededa GP-200) | 1 part |
| Urethane modified silicone oil (Produced of Dainichi-Seika Ind. Co., Ltd.: Diaromer SP-2105) | 0.5 parts |

-continued

| | |
|---|---|
| Methyl ethyl ketone | 70 parts |
| Toluene | 20 parts |
| Magenta ink layer forming coating solution | |
| Compound (M-1) | 2 parts |
| Polyvinylacetal (Product of Denki-Kagaku Ind. Co., Ltd.: Denkabutyral KY-24) | 5.5 parts |
| Polymethyl methacrylate modified polystyrene (Product of Toa-Goseikagaku Ind. Co., Ltd.: Lededa GP-200) | 2 part |
| Urethane modified silicone oil (Product of Dainichi-Seika Ind. Co., Ltd.: Diaromer SP-2105) | 0.5 parts |
| Methyl ethyl ketone | 70 parts |
| Toluene | 20 parts |
| Cyan ink layer forming coating solution | |
| Compound (C-1) | 1.5 parts |
| Compound (C-2) | 1.5 parts |
| Polyvinylacetal (Product of Denki-Kagaku Ind. Co., Ltd.: Denkabutyral KY-24) | 5.6 parts |
| Polymethyl methacrylate modified polystyrene (Product of Toa-Goseikagaku Ind. Co., Ltd.: Lededa GP-200) | 1 part |
| Urethane modified silicone oil (Product of Dainichi-Seika Ind. Co., Ltd.: Diaromer SP-2105) | 0.5 parts |
| Methyl ethyl ketone | 70 parts |
| Toluene | 20 parts |

Compound Y-1

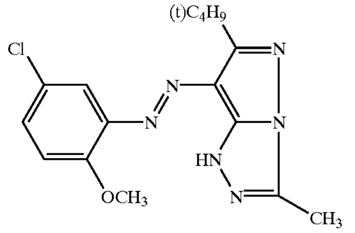

Compound M-1

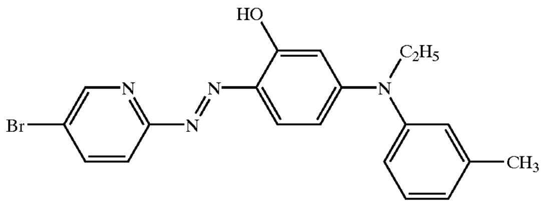

Compound C-1

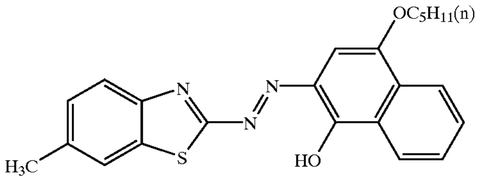

Compound C-2

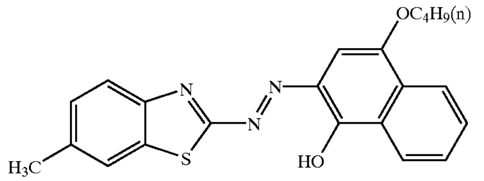

Preparation of Ink Sheets for Melt-Type Thermal Transfer Recording

Ink sheets were obtained by coating and drying ink layer coating solutions of the following compositions so as to make the thickness 2 μm on a polyethylene terephthalate sheet of 6 μm thick, the back-side thereof being subjected to anti-melt-adhesion treatment.

| Ink layer coating solution | |
|---|---|
| Carnauba wax | 1 part |
| Ethylene vinylacetate copolymer (Product of Mitsui Dupont Chemicals Co.: EV40Y) | 1 part |
| Carbon black | 3 parts |
| Phenol resin (Product of Arakawa-Kagaku Ind. Co., Ltd.: Tamanol521) | 5 parts |
| Methyl ethyl ketone | 90 parts |

Formation of a Face Image

A personal image having tone was formed on the image-receiving layer by overlapping an image-receiving layer of an IC-mounted card substrate Nos. 1 to 31 onto the ink-side of an ink sheet, and heating from the ink sheet side by use of a thermal head under conditions of an output power of 0.23 W/dot, a pulse width of 0.3 to 4.5 m·sec and dot density of 16 dot/mm. In the image, dyes described above and nickel in the image-receiving layer formed complexes.

Formation of Letter Information

Further, letter information was formed on OP vanish by overlapping an image-receiving layer or a transparent resin portion onto the ink side of an ink sheet for a melt-type thermal transfer recording and heating from the ink sheet side by use of a thermal head under conditions of an output power of 0.5 W/dot, a pulse width of 1.0 m·sec and dot density of 16 dot/mm.

As described above, a face image, attribute information and a format printing were provided on the aforementioned IC-mounted card substrate to prepare an IC-mounted identificaition card.

<Preparation of Surface Protective Layer of IC-Mounted Personal-Data Certification Card>

Using the IC-mounted personal-data certification cards 1 to 31 prepared above, a protective layer was formed for each card, according to one of surface protective layer preparation methods 1 to 3 described bellow, to prepare an IC-mounted personal-data certification cards attached with a surface protective layer. The thus prepared IC-mounted personal-data certification cards are shown in Table 3. Which method was used to form the surface protective layers and which apparatus of FIGS. 9, 11 or 13 was used to prepare the cards are also shown in Table 3.

Surface Protective Layer Preparation Method 1

According to the procedure shown bellow, after transferring a resin layer onto an IC-mounted personal-data certification card, by use of the following transparent transfer foil, an ultraviolet ray curable protective layer was prepared by using the ultraviolet ray curable resin containing coating solution 1. (The card preparing apparatus of FIG. 9 was used)

<Preparation of Transparent Resin Transfer Foil 1>

The following compositions each were coated by wire bar coating on one side of polyethylene terephthalate (S-25), produced by Diafoil-Hechist Co., and dried to form respective layers.

| Peeling layer: 0.5 $\mu$m thick | |
|---|---|
| Acryl type resin | 5 parts |
| (Product of Mitsubishi Rayon Co., Ltd. Dianal BR-87) | |
| Polyvinyl acetoacetal (SP value: 9.4) | 5 parts |
| (Product of Sekisui Chemicals Co., Ltd. KS-1) | |
| Methyl ethyl ketone | 40 parts |
| Toluene | 50 parts |
| Intermediate layer: 2 $\mu$m thick | |
| Styrene type resin | 5 parts |
| (Kraray Co., Ltd., Septone 2006) | |
| Polyvinylbutyral resin | 5 parts |
| (Sekisui Chemicals Co., Ltd., BL-S) | |
| Toluene | 90 parts |
| Adhesive layer: 2 $\mu$m thick | |
| Styrene type resin | 6 parts |
| (Asahikasei Corp., Tuftec M-1953) | |
| Alicyclic saturated hydrocarbon resin | 3.5 parts |
| (Arakawa Chemicals Co., Ltd., Arucone P100) | |
| Calucium carbonate | 0.5 parts |
| (Okutama Ind. Co., Ltd., Tamapeal TP-123) | |
| Toluene | 90 parts |

A transparent transfer foil 1, composed of the peeling layer, intermediate layer and adhesive layer described above, was prepared.

Further, on the aforementioned image-receiving material recorded with images and letters, a transparent protective layer was transferred, by utilizing the transparent protective layer containing transfer foil composed of the composition described above, with 1.2 sec. heating at at a pressure of $147\times10^4$ kPa, using a heat roll having 5 cm diameter and a rubber hardness of 58, heated at 200° C. of the surface temperature.

The following ultraviolet ray curable resin containing coating solution 1 was coated by a gravure-roll coater having a particular ground pattern, on the aforementioned IC-mounted personal-data certification card having been transferred with the transfer foil 1 described above, so as to make the coated amount 20 g/m$^2$ and cured under the following curing condition to form the ultraviolet ray curable protective layer.

Curing Condition

| | |
|---|---|
| Light-irradiation source: a high-pressure mercury lamp of 60 W/cm$^2$ | |
| Irradiation distance: 10 cm | |
| Irradiation mode: scanning exposure at 3 cm/sec | |
| Ultraviolet curable resin containing coating solution 1 | |
| Bis (3,4-epoxy-6-methylcyclohexylmethyl) adipate | 70 parts |
| BisphenolA glycidyl ether | 10 parts |
| 1,4-butanediol glycidyl ether | 13 parts |
| Triarylsulfonium fluoroantimone | 7 parts |

Surface Protective Layer Preparation Method 2

According to the procedure shown bellow, the coating solutions described bellow were coated successively on the aforementioned support to prepare an actinic-ray curable transfer foil 1 containing an actinic-light curable transfer layer. The coating was performed so as to achieve a predetermined film thickness with a drying temperature of 90° C. The actinic-ray curable composition coating solution was cured by use of a mercury lamp with an exposure intensity of 300 mJ/cm$^2$. An actinic-ray curable protective layer was prepared by transferring a resin layer using this actinic-ray curable transfer foil.

| Preparation of actinic-ray curable transfer foil 1 | |
|---|---|
| Peel layer coating solution: 0.2 $\mu$m thick layer | |
| Polyvinylalcohol (GL-05) | 10 parts |
| (Product of Nippon Synthetic Chemical Co., Ltd.) | |
| Water | 90 parts |
| Actinic-ray curable composition coating solution | |
| A-9300 produced by Shin-Nakamura Cemicals Co. | 35 parts |
| EA-1020 produced by Shin-Nakamura Cemicals Co. | 11.75 parts |
| Reactin initiator (Irgacure 184) | 5 parts |
| Product of Nippon Ciba Geigie Co. | |
| Resin 1 used in actinic-ray curable layer | 48 parts |
| Surfactant F-179 | 0.25 parts |
| Product of Dainippon Ink and Chemicals Incorporated. | |
| Toluene | 500 parts |
| Intermediate layer coating solution: 1.0 $\mu$m thick layer | |
| Polyvinylbutyral resin | 3.5 parts |
| (Product of Sekisui Chemicals Co., Ltd.: S-lec BX-1) | |
| Tuftec M-1913 (Product of Asahikasei Corp.) | 5 parts |
| Hardener (Polyisocyanate) | 1.5 parts |
| (Coronate HX, product of Nippon Polyurethane Co.) | |
| Methyl ethyl ketone | 90 parts |

Synthesis of Resin 1 Used in Actinic-ray Curable Layer

Methyl methacrylate of 73 parts, 15 parts of styrene, 12 parts of methacrylic acid, 500 parts of ethanol and 3 parts of α,α'-azobisisobutyronitrile were charged into a three-necked flask under a stream of nitrogen gas, which was immersed in a oil bath of 80° C. in a stream of nitrogen gas and allowed to react for 6 hrs. Thereafter, 3 parts of triethylammonium chloride and 1.0 parts of glycidyl methacrylate were added and allowed to react for 3 hrs. to obtain the aimed synthetic binder comprised of an acryl type copolymer. The molecular weight (Mw) was 17000 and the acid value was 32.

Adhesive Layer Coating Solution: 0.5 $\mu$m Thick Layer

| | |
|---|---|
| Urethane-modified ethylene-ethyl acrylate coplymer | 8 parts |
| (Product of Toho Chemical Ind. Co., Ltd.: Hytec S6254B) | |
| Polyacrylic acid-ester copolymer | 2 parts |
| (Product of Nipponjunyaku Co., Ltd.: Julimer AT510) | |
| Water | 45 parts |
| Ethanol | 40 parts |

On the aforementioned IC-mounted personal-data certification card recorded with images and letters, an actinic-ray curable layer was transferred, by utilizing the actinic-ray curable transfer foil composed of the composition described above, with 1.2 sec. heating at a pressure of $147\times10^4$ kPa using a heated roll having 5 cm diameter and a rubber hardness of 58, heated at 200° C. of the surface temperature.

Surface Protective Layer Preparation Method 3

The following coating solutions were coated successively on the aforementioned support to prepare an optical variable device transfer foil 1. The coating was performed to achieve the predetermined layer thickness with a dring temperature of 90° C. Using the optical variable device transfer foil prepared, a resin layer was transferred to prepare an optical variable device layer.

| Preparation of optical variable device transfer foil 1 | |
|---|---|
| Peeling layer coating solution: 0.2 μm thick layer | |
| Polyvinylalcohol (GL-05) | 10 parts |
| (Product of Nippon Synthetic Chemical Co., Ltd.) | |
| Water | 90 parts |
| Optical variable device layer: 2 μm thick layer | |
| Hologram image | |
| Intermediate layer coating solution: 1.0 μm thick layer | |
| Polyvinylbutyral resin | 3.5 parts |
| (Product of Sekisui Chemicals Co., Ltd.: S-lec BX-1) | |
| Tuftec M-1913 (Product of Asahikasei Corp.) | 5 parts |
| Hardener (Polyisocyanate) | 1.5 parts |
| (Coronate HX, product of Nippon Polyurethane Co.) | |
| Methyl ethyl ketone | 90 parts |

Curing by a curing agent was performed at 50° C. for 24 hrs.

Adhesive Layer Coating Solution: 0.5 μm Thick Layer

| | |
|---|---|
| Urethane-modified ethylene-ethyl acrylate copolymer | 8 parts |
| (Product of Toho Chemical Ind. Co., Ltd.: Hytec S6254B) | |
| Polyacrylic acid-ester copolymer | 2 parts |
| (Product of Nipponjunyaku Co.,Ltd.: Julimer AT510) | |
| Water | 45 parts |
| Ethanol | 40 parts |

On the aforementioned IC-mounted personal-data certification card recorded with images and letters, an optical variable device layer was transferred, by utilizing the optical variation device transfer foil composed of the composition described above, with 1.2 sec. heating at a pressure of $147\times10^4$ kPa using a heat roll having 5 cm diameter and a rubber hardness of 58, heated at 200° C. of the surface temperature. The apparatus used for the transfer is shown in Table 4.

The following evaluations were performed for 32 kinds of IC-mounted personal-data certification cards (inventive examples No. 1 to 22, the comparative examples: No. 1 to 10)

Evaluation of Printing Property

Printing property of the finished cards was visually evaluated according to the following criteria.

A; letters are printed without any problem,

B; letters are slightly scratchy

C; letters are not printed

Evaluation of Chemical Resistance

The finished card was immersed in a solution of 50% solution of isopropyl alcohol (IPA) at 25° C. of a solution temperature for 1 day, and the surface of the card was observed. The evaluation was performed according to the following evaluation criteria.

A; no changes from the initial card

B; not less than 50% of images are scratchy

C; images are disappeared

Evaluation of Curl Property

The card is placed on a flat plate with the second sheet member (the front side sheet) facing upward. The card is rested flat, the edge of one side of the card of 55 mm×85 mm in size being pressed by a finger, and a distance (mm) between the edge of the opposite side of the card and the flat plate was measured.

Evaluation of Strength Against Point Pressure

A weight of 200 g was applied to the place where an IC-tip is included in the card, and whether the IC function is missing or not was evaluated.

A; not missing

C; missing

The results are shown in Table 5.

TABLE 3

| IC-mounted personal-data certification card | IC-mounted personal-data certification card preparation method: IC-mounted card used | IC-mounted personal-data certification card preparation method: Preparation apparatus | Surface protective layer forming method: Card-side | Surface protective layer forming method: Outermost surface | Evaluation results of IC-mounted personal-data certification card: Printing property | Evaluation results: Chemical resistance | Evaluation results: Curl property (mm) | Evaluation results: Strength against point pressure |
|---|---|---|---|---|---|---|---|---|
| Inv. Ex. 1 | 1 | FIG. 13 | 2 | 2 | A | A | 2 | A |
| Inv. Ex. 2 | 2 | FIG. 13 | 2 | 2 | A | A | 1 | A |
| Inv. Ex. 3 | 3 | FIG. 9 | — | 1 | A | A | 2 | A |
| Inv. Ex. 4 | 4 | FIG. 13 | 2 | 2 | A | A | 2 | A |
| Inv. Ex. 5 | 5 | FIG. 9 | — | 1 | A | A | 0 | A |
| Inv. Ex. 6 | 6 | FIG. 13 | 2 | 2 | A | A | 0 | A |
| Inv. Ex. 7 | 7 | FIG. 13 | 2 | 2 | A | A | 0 | A |
| Inv. Ex. 8 | 8 | FIG. 13 | 2 | 2 | A | A | 0 | A |
| Inv. Ex. 9 | 9 | FIG. 9 | — | 1 | A | A | 0 | A |
| Inv. Ex. 10 | 10 | FIG. 9 | — | 1 | A | A | 0 | A |
| Inv. Ex. 11 | 11 | FIG. 9 | — | 1 | Aa | A | 0 | A |
| Inv. Ex. 12 | 12 | FIG. 9 | — | 1* | A | B | 3 | A |
| Inv. Ex. 13 | 12 | FIG. 13 | 2 | 2 | A | A | 4 | A |
| Inv. Ex. 14 | 13 | FIG. 13 | 2 | 2 | A | A | 5 | A |
| Inv. Ex. 15 | 14 | FIG. 11 | — | 2 | A | A | 5 | A |

TABLE 3-continued

| IC-mounted personal-data certification card | IC-mounted card used | IC-mounted personal-data certification card preparation method: Preparation apparatus | Surface protective layer forming method: Card-side | Surface protective layer forming method: Outermost surface | Evaluation results of IC-mounted personal-data certification card: Printing property | Chemical resistance | Curl property (mm) | Strength against point pressure |
|---|---|---|---|---|---|---|---|---|
| Inv. Ex. 16 | 15 | FIG. 11 | — | 2 | A | A | 4 | Aa |
| Inv. Ex. 17 | 16 | FIG. 11 | — | 2 | A | A | 0 | A |
| Inv. Ex. 18 | 17 | FIG. 9 | — | 1 | A | A | 0 | A |
| Inv. Ex. 19 | 18 | FIG. 13 | 2 | 2 | A | A | 0 | A |
| Inv. Ex. 20 | 19 | FIG. 9 | — | 1 | A | A | 0 | A |
| Inv. Ex. 21 | 20 | FIG. 13 | 2 | 2 | A | A | 0 | A |
| Inv. Ex. 22 | 21 | FIG. 13 | 3 | 2 | A | A | 0 | A |
| Comp. Ex. 1 | 22 | FIG. 13 | 3 | 2 | B | A | 15 | C |
| Comp. Ex. 2 | 23 | FIG. 13 | 2 | 2 | B | A | 19 | C |
| Comp. Ex. 3 | 24 | FIG. 13 | 2 | 2 | B | B | 3 | C |
| Comp. Ex. 4 | 25 | FIG. 9 | — | 1 | B | C | 2 | C |
| Comp. Ex. 5 | 26 | FIG. 9 | — | 1 | C | B | 1 | C |
| Comp. Ex. 6 | 27 | FIG. 11 | — | 2 | C | B | 2 | C |
| Comp. Ex. 7 | 28 | FIG. 9 | — | 1* | C | C | 3 | C |
| Comp. Ex. 8 | 29 | FIG. 9 | — | 1 | C | A | 3 | C |
| Comp. Ex. 9 | 30 | FIG. 9 | — | 1 | C | A | 19 | C |
| Comp. Ex. 10 | 31 | FIG. 13 | 3 | 2 | C | A | 21 | C |

1*: only a transparent resin foil(without a curable layer)

THE EFFECT OF THE INVENTION

An IC-mounted personal-data certification card having deformation, improved printing property with such as thermal transfer and improved durability against the invading of chemicals is obtained.

What is claimed is:

1. An IC-mounted card substrate comprising a first sheet member having at least a first support, a second sheet member having at least a second support and an electronic part fixing layer having therein an IC-module and provided between the first sheet member and the second sheet member, wherein the second sheet member has a cushion layer comprising an actinic ray-cured resin on the second support, and a displacement value of needle penetration of the cushion layer obtained by a thermo-mechanical analysis (TMA) apparatus is not more than 30% at temperature of 100° C. and not less than 30% at a temperature of 150° C. based on a thickness of the cushion layer.

2. The IC-mounted card substrate of claim 1, wherein the second sheet member further comprises an image-receiving layer on the cushion layer.

3. The IC-mounted card substrate of claim 1, wherein the cushion layer is cushioning image-receiving layer.

4. The IC-mounted card substrate of claim 1, wherein adhesive layers are provided between the first sheet member and the electronic part fixing layer and between the second sheet member and the electronic part fixing layer, respectively.

5. The IC-mounted card substrate of claim 1, wherein the thickness of each of the first support and the second support is within the range of 30 to 300 μm.

6. The IC-mounted card substrate of claim 1, wherein the thickness of the cushion layer is within the range of 5 to 50 μm.

7. The IC-mounted card substrate of claim 1, wherein the cushion layer further comprises a cushioning auxiliary agent containing at least one of a thermoplastic resin, a thermoplastic elastomers, a hot-melt adhesives and a resin having rubber elasticity.

8. The IC-mounted card substrate of claim 2, wherein the second sheet member further comprises a protective layer on the image-receiving layer, and the protective layer contains at least one of a thermo-curable resin and a photo-curable resin.

9. The IC-mounted card substrate of claim 3, wherein the second sheet member further comprises a protective layer on the cushioning image-receiving layer, and the protective layer contains at least one of a thermo-curable resin and photo-curable resin.

10. The IC-mounted card substrate of claim 1, wherein the cushion layer is provided on the outside of the second support.

* * * * *